US012199326B2

(12) United States Patent
Tucker et al.

(10) Patent No.: US 12,199,326 B2
(45) Date of Patent: Jan. 14, 2025

(54) FABRICATION PROCESSES FOR METAL-SUPPORTED PROTON CONDUCTING SOLID OXIDE ELECTROCHEMICAL DEVICES

(71) Applicant: The Regents of the University of California, Oakland, CA (US)

(72) Inventors: Michael Tucker, Piedmont, CA (US); Ruofan Wang, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 132 days.

(21) Appl. No.: 16/868,005

(22) Filed: May 6, 2020

(65) Prior Publication Data

US 2020/0358122 A1 Nov. 12, 2020

Related U.S. Application Data

(60) Provisional application No. 62/846,233, filed on May 10, 2019.

(51) Int. Cl.
*H01M 8/1226* (2016.01)
*H01M 4/88* (2006.01)
(Continued)

(52) U.S. Cl.
CPC ....... *H01M 8/1226* (2013.01); *H01M 4/8885* (2013.01); *H01M 4/9033* (2013.01); *H01M 4/9066* (2013.01); *H01M 2008/1293* (2013.01)

(58) Field of Classification Search
CPC ............. H01M 8/1226; H01M 4/8885; H01M 4/9033; H01M 4/9066; H01M 2008/1293;
(Continued)

(56) References Cited

U.S. PATENT DOCUMENTS

| 7,438,837 B2 | 10/2008 | Hatano et al. |
| 2010/0143824 A1* | 6/2010 | Tucker ................. H01M 8/124 429/479 |

(Continued)

FOREIGN PATENT DOCUMENTS

| CN | 1964113 A | * | 5/2007 |
| CN | 103531833 A | * | 1/2014 |

(Continued)

OTHER PUBLICATIONS

Author: Nima Shaigan, Wei Qu, Douglas G. Ivey, Weixing Chen, Title: "A review of recent progress in coatings, surface modifications and alloy developments for solid oxide fuel cell ferritic stainless steel interconnects", Journal of Power Sources vol. 195, 1529, Date: Mar. 15, 2010 (Year: 2010).*

(Continued)

*Primary Examiner* — Matthew T Martin
*Assistant Examiner* — Jared Hansen
(74) *Attorney, Agent, or Firm* — Lowenstein Sandler LLP

(57) ABSTRACT

This disclosure provides systems, methods, and apparatus related to metal-supported proton conducting solid oxide electrochemical devices. In one aspect, a method includes forming an electrode on a metal support of a device with a first proton-conducting ceramic. The metal support comprises an iron-chromium alloy. The first proton-conducting ceramic is in a powder form. An electrolyte layer is formed on the electrode and on the metal support of the device with a second proton-conducting ceramic. The second proton-conducting ceramic is in a powder form. The device is thermally treated at about 1200° C. to 1550° C.

20 Claims, 23 Drawing Sheets

(51) Int. Cl.
*H01M 4/90* (2006.01)
*H01M 8/12* (2016.01)

(58) Field of Classification Search
CPC .. H01M 2300/0074; H01M 2300/0077; Y02E 60/50
See application file for complete search history.

(56) References Cited

U.S. PATENT DOCUMENTS

| | | | | |
|---|---|---|---|---|
| 2011/0269047 | A1* | 11/2011 | Tucker | H01M 4/9033 429/522 |
| 2012/0021288 | A1* | 1/2012 | Song | C04B 35/447 252/182.1 |
| 2012/0186976 | A1* | 7/2012 | Laucournet | H01M 8/0243 204/252 |
| 2015/0064596 | A1* | 3/2015 | Leah | H01M 4/9033 429/465 |
| 2016/0072143 | A1* | 3/2016 | Singh | H01M 8/12 429/410 |
| 2016/0181646 | A1 | 6/2016 | Ecke | |
| 2016/0197356 | A1* | 7/2016 | Montinaro | C25D 21/12 429/522 |
| 2016/0233535 | A1 | 8/2016 | Leah et al. | |
| 2017/0062855 | A1 | 3/2017 | Lim et al. | |
| 2017/0141429 | A1 | 5/2017 | Lee et al. | |
| 2018/0022655 | A1* | 1/2018 | Majima | H01G 4/1227 501/135 |
| 2018/0205096 | A1* | 7/2018 | Hiraiwa | C25B 9/73 |
| 2018/0331381 | A1* | 11/2018 | Lee | H01M 8/126 |
| 2019/0051916 | A1* | 2/2019 | Bone | H01M 8/0273 |
| 2020/0014052 | A1* | 1/2020 | Bartel | C04B 35/563 |

FOREIGN PATENT DOCUMENTS

| | | | | |
|---|---|---|---|---|
| EP | 3404760 A1 | * | 11/2018 | |
| KR | 20090118579 A | * | 11/2009 | |
| KR | 20130022828 A | * | 3/2013 | H01M 4/882 |

OTHER PUBLICATIONS

Author: R. Nédélec, R. Neagu, S. Uhlenbruck, R. Maric, D. Sebold, H.-P. Buchkremer, D. Stöver, Title: "Gas phase deposition of diffusion barriers for metal substrates in solid oxide fuel cells", Surface and Coatings Technology vol. 205, 3999, Date: May 15, 2011 (Year: 2011).*

Author: Vacuum Industries, Inc., Title; "Vacuum Hot Press Furnace for Powder Compaction", Metal Powder Report vol. 37 No. 11, Date: Nov. 1982. (Year: 1982).*

Author: Francisco J.A. Loureiro et al. Title: "A review on sintering technology of proton conducting BaCeO3-BaZrO3 perovskite oxide materials for Protonic Ceramic Fuel Cells", Journal of Power Sources vol. 438, 226991, Date: Oct. 31, 2019 (Year: 2019).*

Author: Fei He, Duo Song, Ranran Peng, Guangyao Meng, Shangfeng Yang, Title: "Electrode performance and analysis of reversible solid oxide fuel cells with proton conducting electrolyte of BaCe0.5Zr0.3Y0.2O3-δ", Journal of Power Sources vol. 195, 3359, Date: Jun. 1, 2010 (Year: 2010).*

Author: Kong, Ling Bing et al., Title: "Sintering and Densification of Transparent Ceramics", Transparent Ceramics (Topics in Mining, Metallurgy and Materials Engineering book series), p. 467, Date: 2015 (Year: 2015).*

CN1964113A, machine English translation of document, Inventor: Shen Chunhui Zhu, Title: "A bipolar plate for conductive ceramics/graphite proton exchange membrane fuel cell and its manufacture method", Date: Feb. 15, 2022 retrieved from https://worldwide.espacenet.com/ (Year: 2007).*

EP3404760A1, machine English translation of document, Inventor: Matte Eric, Lupetin Piero, Title: "Fuel cell device", Date: Feb. 16, 2022 retrieved from https://worldwide.espacenet.com/ (Year: 2018).*

Haugsrud, Reidar, and Truls Norby. "Proton conduction in rare-earth ortho-niobates and ortho-tantalates." Nature Materials 5.3 (2006): 193-196 (Year: 2006).*

CN103531833A, Guo Ruisong, et al., "Proton conductor material in lithium/yttrium carbonate doped cerium barium zirconium complex phase structure", retrieved from PE2E Aug. 29, 2022 (Year: 2014).*

KR20090118579A, Cho, et al., "Metal-supported sofcs and methods for manufacturing the same using porous thick-film metal support", machine English translation retrieved from https://worldwide.espacenet.com/ Date: Oct. 24, 2023 (Year: 2009).*

KR20130022828A, Shul, et al. "Proton conductor for electrolyte of solid oxide fuel cells and solid oxide fuel cells comprising same", machine English translation retrieved from https://worldwide.espacenet.com/ Date: Mar. 19, 2023 (Year: 2013).*

Jin, Chao, et al. "Effect of Ba nonstoichiometry on the phase composition, microstructure, chemical stability and electrical conductivity of BaxCe0.7Zr0.1Y0.1Yb0.1O3-δ ($0.9 \leq x \leq 1.1$) proton conductors." Ceramics International 41.6 (2015): 7796-7802 (Year: 2015).*

Bae, Kiho, et al. "High-performance protonic ceramic fuel cells with thin-film yttrium-doped barium cerate-zirconate electrolytes on compositionally gradient anodes." ACS applied materials & interfaces 8.14 (2016): 9097-9103 (Year: 2016).*

Wang et al., "Assessment of co-sintering as a fabrication approach for metal-supported proton-conducting solid oxide cells," Solid State Ionics, vol. 332, pp. 25-33, (Jan. 3, 2019).

Wang et al., "Approaches for co-sintering metal-supported proton-conducting solid oxide cells with Ba(Zr,Ce,Y,Yb)O3-δ electrolyte," International Journal of Hydrogen Energy, vol. 44, pp. 13768-13776, (Apr. 15, 2019).

Fabbri et al., "Towards the Next Generation of Solid Oxide Fuel Cells Operating Below 600° C. with Chemically Stable Proton-Conducting Electrolytes," Advanced Materials, vol. 24, pp. 195-208, (2012).

Fabbri et al., "Tailoring the chemical stability of Ba(Ce0.8-xZrx)Y0.2O3-δ protonic conductors for intermediate temperature solid oxide fuel cells (IT-SOFCs)," Solid State Ionics, vol. 179, pp. 558-564, (Apr. 2, 2008).

Tucker, "Dynamic-temperature operation of metal-supported solid oxide fuel cells," Journal of Power Sources, vol. 395, pp. 314-317, (May 29, 2018).

Tucker, "Durability of symmetric-structured metal-supported solid oxide fuel cells," Journal of Power Sources, vol. 369, pp. 6-12, (Oct. 3, 2017).

Tucker, "Development of High Power Density Metal-Supported Solid Oxide Fuel Cells," Energy Technology, vol. 5, pp. 2175-2181, (2017).

Tucker, "Progress in metal-supported solid oxide fuel cells: A review," Journal of Power Sources, vol. 195, pp. 4570-4582, (Feb. 20, 2010).

Tucker et al., "Performance of metal-supported SOFCs with infiltrated electrodes," Journal of Power Sources, vol. 171, pp. 477-482, (Jun. 15, 2007).

Wang et al., "Metal-Supported Solid Oxide Electrolysis Cell withSignificantly Enhanced Catalysis," Energy Technology, vol. 7, pp. 1801154 (1-13), (2019).

Larring et al., "Critical Issues of Metal-Supported Fuel Cell," Solid Oxide Fuels Cells: Facts and Figures, By J. T. S. Irvine, London, pp. 71-93, (2013).

Krishnan, "Recent developments in metal-supported solid oxide fuel cells," Wiley Interdisciplinary Reviews, Energy Environ., vol. 6, pp. 1-35, (Sep./Oct. 2018).

Dogdibegovic et al., "High Performance Metal-Supported Solid Oxide Fuel Cells with Infiltrated Electrodes," Journal of Power Sources, vols. 410-411, pp. 91-98, (2019).

Stange et al., "Development of novel metal-supported proton ceramic electrolyser cell with thin film BZY15-Ni electrode and BZY15 electrolyte," International Journal of Hydrogen Energy, vol. 42, pp. 13454-13462, (Apr. 1, 2017).

Stefan et al., "Layered microstructures based on BaZr0.85Y0.15O3-δ by pulsed laser deposition for metal-supported proton ceramic electrolyser cells," Journal of Materials Science, vol. 52, pp. 6486-6497, (Feb. 2, 2017).

(56) References Cited

OTHER PUBLICATIONS

Sholklapper et al., "Synthesis and Stability of a Nanoparticle-Infiltrated SolidOxide Fuel Cell Electrode," The Electrochemical Society, vol. 10, No. 4, pp. B74-B76, (Jan. 31, 2007).
Bi et al., "Solid oxide fuel cells with proton-conducting La0.99Ca0.01NbO4 electrolyte," Electrochimica Acta, vol. 260, No. 10, pp. 748-754, (2018).
Bi et al., "In Situ Fabrication of a Supported Ba3Ca1.18Nb1.82O9-δ Membrane Electrolyte for a Proton-Conducting SOFC," Journal of the American Ceramic Society, vol. 91, No. 11, pp. 3806-3809, (Aug. 20, 2008).
Ling et al., "New ionic diffusion strategy to fabricate proton-conducting solid oxide fuel cells based on a stable La2Ce2O7 electrolyte," International Journal of Hydrogen Energy, vol. 38, pp. 7430-7437, (2013).
Magraso et al., "Development of proton conducting SOFCs based on LaNbO4 electrolyte-status in Norway," Fuel Cells, vol. 11, No. 1, pp. 17-25, (2011).
Magraso et al., "Cathode compatibility, operation, and stability of LaNbO4-based proton conducting fuel cells," Solid State Ionics, vol. 262, pp. 382-387, (2014).
Margaso et al., "Novel Fabrication of Ca-Doped LaNbO4 Thin-Film Proton-Conducting Fuel Cells by Pulsed Laser Deposition," Journal of the American Ceramic Society, vol. 93, No. 7, pp. 1874-1878, (Jul. 2010).
Sakai et al., "Intermediate temperature steam electrolysis using strontium zirconate-based protonic conductors," International Journal of Hydrogen Energy, vol. 34, No. 1, pp. 56-63, (Jan. 2009).
Xie et al., "Preparation of La1.9Ca0.1Zr2O6.95 with pyrochlore structure and its application in synthesis of ammonia at atmospheric pressure," Solid State Ionics, vol. 168, No. 1-2, pp. 117-121, (Mar. 15, 2004).
Myles et al., "Characterization and Performance of Proton Conducting Solid Oxide Fuel Cells Manufactured Using Reactive Spray Deposition Technology," The Electrochemical Society, vol. 72, No. 25, pp. 17-23, (2016).
Mercadelli et al., "Key Issues in Processing Metal-Supported Proton Conducting Anodes For SOFC Applications," The Electrochemical Society, vol. 35, No. 1, pp. 1761-1769, (2011).
Hansen et al., "The Effect of a CGO Barrier Layer on the Performance of LSM/YSZ SOFC Cathodes," Journal of the Electrochemical Society, vol. 157, No. 3, pp. B309-B313, (2010).
Babilo et al., "Enhanced sintering of yttrium-doped barium zirconate by addition of ZnO," Journal of the American Ceramic Society, vol. 88, No. 9, pp. 2362-2368, (Mar. 14, 2005).
Tsai et al., "Low temperature sintering of Ba(Zr0.8-XCexY0.2)O3-δ using lithium fluoride additive," Solid State Ionics, vol. 181, No. 23-24, pp. 1083-1090, (Aug. 2010).
Li et al., "Stable and easily sintered BaCe0.5Zr0.3Y0.2O3-δ electrolytes using ZnO and Na2CO3 additives for protonic oxide fuel cells," Electrochimica Acta, vol. 95, pp. 95-101, (Apr. 15, 2013).
Nikodemski et al., "Solid-state reactive sintering mechanism for proton conducting ceramics," Solid State Ionics, vol. 253, pp. 201-210, (Sep. 16, 2013).

\* cited by examiner

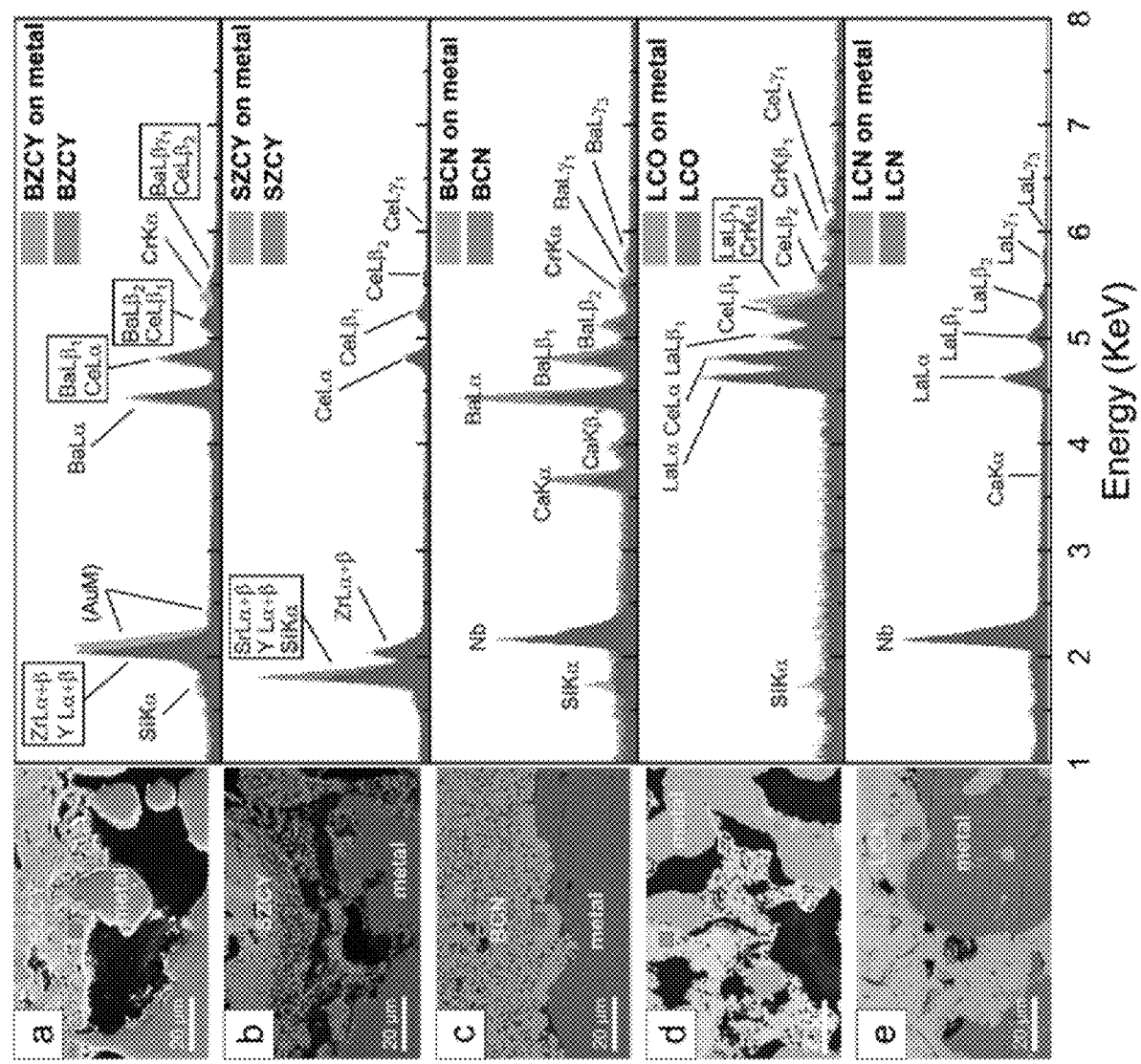

FIG. 14A No sintering aid
FIG. 14C Co₃O₄
FIG. 14E ZnO
FIG. 14G NiO
FIG. 14I LiF

FABRICATION PROCESSES FOR METAL-SUPPORTED PROTON CONDUCTING SOLID OXIDE ELECTROCHEMICAL DEVICES

RELATED APPLICATIONS

This application claims priority to U.S. Provisional Patent Application No. 62/846,233, filed May 10, 2019, which is herein incorporated by reference.

STATEMENT OF GOVERNMENT SUPPORT

This invention was made with government support under Contract No. DE-AC02-05CH11231 awarded by the U.S. Department of Energy and under Award No. DE-EE0008080 awarded by the U.S. Department of Energy, Office of Energy Efficiency and Renewable Energy, Fuel Cell Technologies Office.

TECHNICAL FIELD

This disclosure relates generally to metal-supported proton conducting solid oxide electrochemical devices.

BACKGROUND

Proton-conducting oxide ceramics are widely explored as alternatives to conventional oxide conductors, primarily because the proton conductors display higher conductivity at intermediate temperatures (400-600° C.). Use of proton conducting electrolytes in solid oxide fuel cells (SOFCs) and electrolysis cells (SOECs) enables efficient operation at lower temperatures, reducing thermal stress and allowing the use of less expensive stack materials and balance-of-plant components. Transport of protons across the electrolyte offers other advantages at all temperatures: for electrolysis, pure hydrogen is produced so steam does not need to be removed from the product stream; for fuel cell operation, extraction of hydrogen from the anode through the electrolyte can drive fuel decomposition or reforming reactions forward. Protonic ceramic fuel cells (PCFCs) furthermore resist carbon coking and are tolerant to sulfur, enabling stable operation with a wide variety of hydrocarbon fuels. Proton conductors are also the basis for sensors and other electrochemical processes, including ammonia synthesis, hydrogen electrochemical compression, hydrogen separation, and conversion of $CO_2$ to $CH_4$.

Metal-supported solid oxide fuel cells (MS-SOFCs) incorporate thin layers of electrochemically-active ceramics supported on thicker metal layers that provide mechanical support and electronic current collection. MS-SOFCs promise high performance provided by the active ceramic layers, and excellent mechanical properties and low materials cost derived from the metal support. In contrast to conventional all-ceramic SOFCs, MS-SOFCs offer further operational advantages including; mechanical ruggedness; tolerance to very rapid thermal cycling both during start-up and variable operation; and tolerance to oxidation of the fuel catalyst, which occurs during high fuel utilization, intermittent fuel use, or unexpected loss of fuel supply (i.e., due to failure in the fuel delivery subsystem). Because of these cost and operational advantages, MS-SOFCs are being developed for applications that require fast-start or intermittent operation, including personal power generators, residential combined heat and power, vehicle range extenders, and electrolysis cells for conversion of variable power sources such as wind and solar.

Ferritic stainless steel is a typical choice for the metal support, as it displays good oxidation resistance below about 800° C., has a coefficient of thermal expansion that is similar to common SOFC ceramic materials, and is very inexpensive compared to other alloys with similar corrosion resistance.

BRIEF DESCRIPTION OF THE DRAWINGS

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

FIG. 3A—BZCY, FIG. 3B—SZCY, FIG. 3C—BCN, FIG. 3D—LCZ, FIG. 3E—LCO, and FIG. 3F—LCN. The desired phases for LCZ and LCO were not obtained after reducing atmosphere sintering, and these were therefore re-oxidized in air at 850° C. Peaks arising from the sample holder are indicated by "#".

FIGS. 4A-4J show the compositional and phase stability after co-sintering on metal support. SEM images and corresponding EDS area analyses of proton conductors sintered on metal support: FIG. 4A—BZCY, FIG. 4B—SZCY, FIG. 4C—BCN, FIG. 4D—LCO, and FIG. 4E—LCN. EDS analyses were conducted in areas close to metal support, as illustrated in SEM images. Surface XRD patterns of proton conductors: FIG. 4F—BZCY, FIG. 4G—SZCY, FIG. 4H—BCN, FIG. 4I—LCO, and FIG. 4J—LCN.

FIG. 10A shows dilatometry and FIGS. 10B-10D show cross-section SEM images of pellets sintered in a reducing tube furnace at 1450° C. in 2% $H_2$/Ar for 4 h.

FIGS. 14A-14L show the impact of sintering aids. FIGS. 14A-14J shows SEM images of polished cross section microstructure of BZCY721 sintered with various sintering aids (2 wt %) in air (top row) and reducing atmosphere (bottom row) at 1450° C. FIG. 14K shows dilatometry of BZCY721 with and without 2 wt % LiF in reducing atmosphere. FIG. 14L shows dilatometry of BZCYYb4411 with and without 2 wt % manganese oxide in reducing atmosphere.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

Figure 1A:
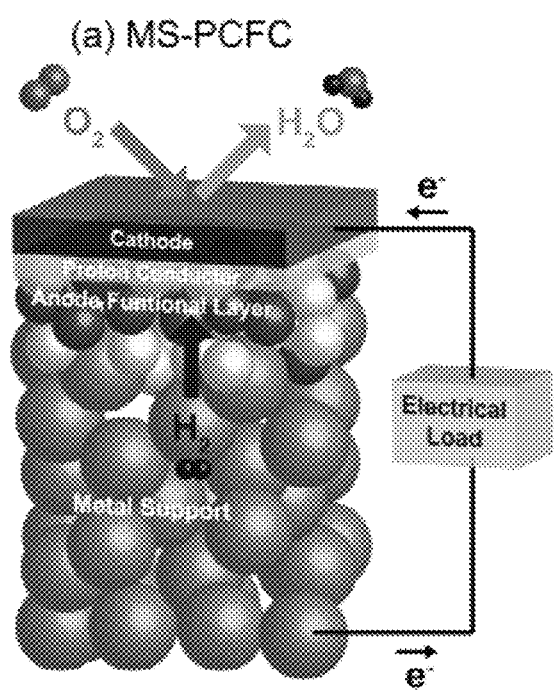
FIG. 1A shows an example of a schematic representation of metal supported protonic ceramic fuel cell (MS-PCFC).
Figure 1B:
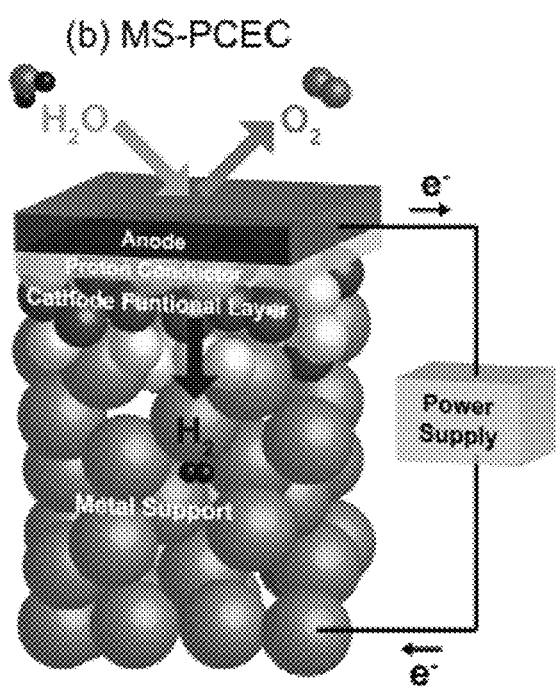
FIG. 1B shows an example of a schematic representation of a metal supported protonic ceramic electrolysis cell (MS-PCEC). Only a thin portion of the hydrogen electrode layer, as required for electrochemical function, is retained in the MSC design.

Given the advantages of PCFCs and MS-SOFCs discussed above, it is of interest to develop metal-supported protonic ceramic electrochemical cells. FIGS. 1A and 1B illustrate metal-supported protonic ceramic cells operating in fuel cell and electrolysis conditions. To date, the preliminary work in this field is limited to the use of barium cerium yttrium zirconate (BZCY) type materials as the electrolyte. Throughout the description, the primary material in a family is listed, and the family may include other compositions with dopants, substitutions, or additives. For example, $BaZr_{0.4}Ce_{0.4}Y_{0.1}Yb_{0.1}O_{3-\delta}$ (BZCYYb4411) is a BZCY-type material.

Figure 2:
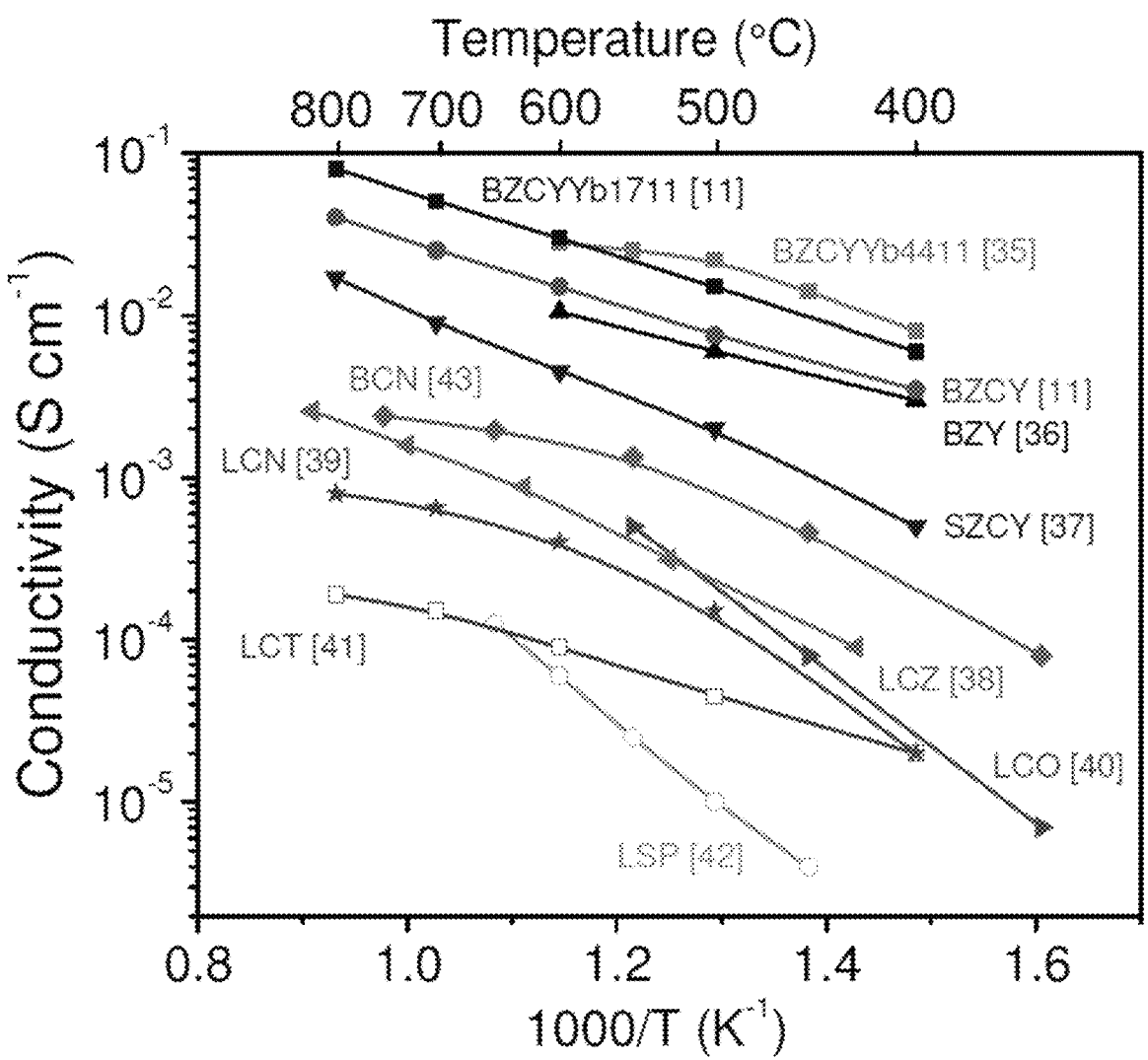
FIG. 2 shows the conductivities of representative proton conductors.

FIG. 2 shows the conductivities of representative proton conductors. While BZCY-type materials are the most-studied proton conductors for PCFCs due to their high conductivity, other proton conductors may be more compatible with the metal-supported cell architecture, materials set, and processing constraints. Co-sintering a ceramic layer on stainless steel is challenging, in part because reducing sintering atmosphere is required to prevent oxidation of the steel. Processing oxide ceramics in reducing atmosphere may cause decomposition, impart oxygen non-stoichiometry, exacerbate evaporation of various elements, or result in poor sintering. Contact with the metal support may further cause undesirable interdiffusion between the layers.

Figure 17:
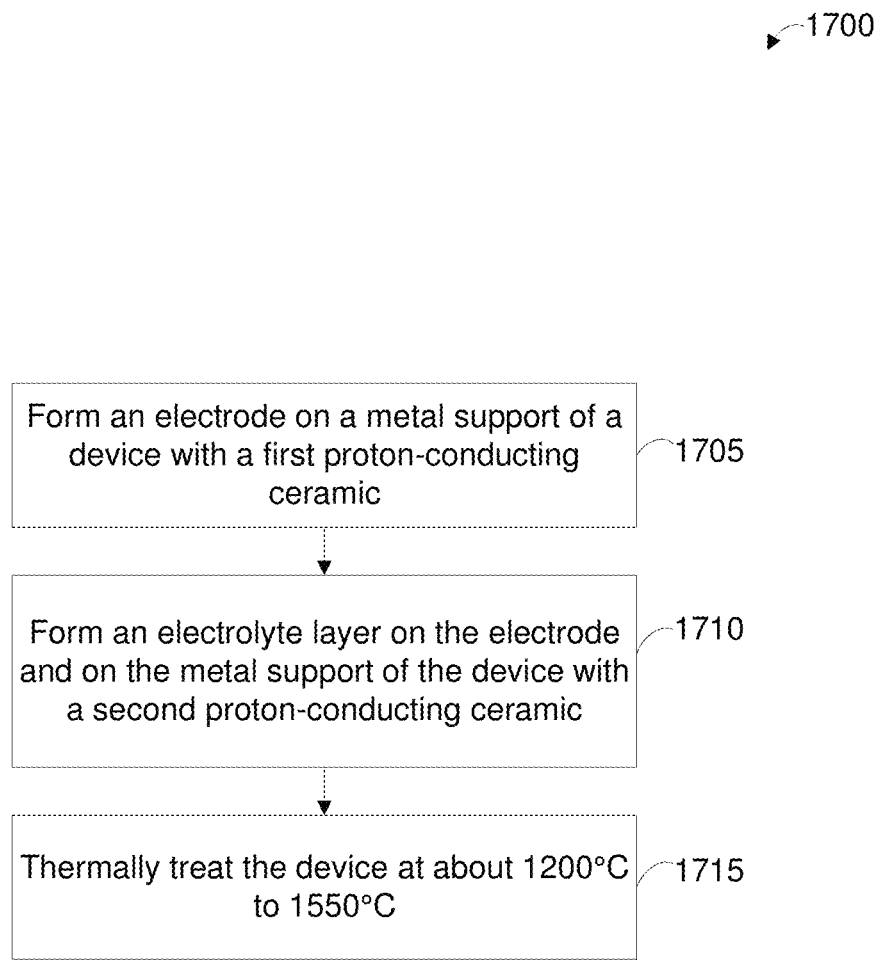
FIG. 17 shows an example of a flow diagram illustrating a fabrication process for a metal-supported proton conducting solid oxide electrochemical devices.

FIG. 17 shows an example of a flow diagram illustrating a fabrication process for a metal-supported proton conducting solid oxide electrochemical device. Starting at block 1705 of the method 1700 shown in FIG. 17, an electrode is formed on a metal support of a device with a first proton-conducting ceramic. In some embodiments, the electrode is a fuel-side electrode. In some embodiments, the electrode is an air-side electrode. In some embodiments, the metal support comprises an iron-chromium alloy. In some embodiments, the metal support comprises a stainless steel or a ferritic stainless steel. In some embodiments, the first proton-conducting ceramic is in a powder form.

In some embodiments, the device is selected from a group consisting of a metal supported solid oxide fuel cell (MS-SOFC), a metal supported solid oxide electrolysis cell, a metal supported solid oxide electrochemical reactor, a metal supported solid oxide oxygen generator, a metal supported solid oxide electrochemical hydrogen generator, and a metal supported solid oxide electrochemical hydrogen compressor.

At block 1710, an electrolyte layer is formed on the electrode and on the metal support of the device with a second proton-conducting ceramic. In some embodiments, the second proton-conducting ceramic is in a powder form. In some embodiments, the first proton conducting ceramic and the second proton conducting ceramic are the same proton conducting ceramic. In some embodiments, the first proton-conducting ceramic and the second proton-conducting ceramic are selected from a group consisting of lanthanum calcium niobate, barium cerium yttrium zirconate, and samarium cerium yttrium zirconate. Techniques to form both the electrode at block 1705 and the electrolyte layer at block 1710 include dip coating, screen-printing, tape casting, and spray deposition (e.g., aerosol or thermal spray deposition).

At block 1715, the device is thermally treated at about 1200° C. to 1550° C. In some embodiments, the thermal treatment is for about 1 hour to 20 hours. In some embodiments, the thermal treatment serves to sinter the porous metal, first proton-conducting ceramic, and the second proton-conducting ceramic. In some embodiments, the device is thermally treated at about 1300° C. to 1450° C., or about 1350° C. In some embodiments, after block 1715, the electrode includes some porosity and the electrolyte layer is impermeable to gasses (e.g., at least about 90% or about 95% of theoretical density).

In some embodiments, the operation in block 1715 is performed in a reducing atmosphere. In some embodiments, the reducing atmosphere comprises or consists essentially of hydrogen. In some embodiments, the reducing atmosphere comprises argon and hydrogen (e.g., about 2% hydrogen, about 2.9% hydrogen, or about 0.5% hydrogen to about 99% hydrogen.

In some embodiments, the operation in block 1715 is performed in a reducing atmosphere, and the electrode, the electrolyte layer, or both the electrode and the electrolyte layer include a sintering aid. A sintering aid can reduce the sintering temperature required for electrolyte densification, which in turn reduces the silicon and chromium diffusion from the metal support into the electrolyte layer (e.g., BZCY). The sintering aid can also improve the densification of the first and the second proton-conducting powders. In some embodiments, when the first or the second proton-conducting ceramic comprises BZCY, lowering the sintering temperature reduces barium evaporation. In some embodiments, the sintering aid is selected from a group consisting of lithium hydride, lithium fluoride, lithium carbonate, lithium oxide, manganese oxide, and barium yttrium nickelate.

In some embodiments, the operation in block 1715 is performed in a high vacuum, or at about $10^{-4}$ Torr or lower. High vacuum is generally considered to be about $10^{-4}$ to $10^{-8}$ Torr. In some embodiments, the high vacuum serves to remove silicon vapor that evaporates from the metal support during the thermal treatment.

In some embodiments, the method 1700 further comprises forming a barrier layer on the metal support prior to block 1705. In some embodiments, the barrier layer reduces or minimizes silicon and chromium diffusion from the metal support into the first proton conducting ceramic (e.g., BZCY) and the second proton conducting ceramic (e.g., BZCY). The barrier layer can be formed by various techniques, including tape-casting, screen printing, aerosol spray, or painting it onto the metal support or dipping the metal support into a slurry including the barrier layer.

In some embodiments, the barrier layer is selected from a group consisting of yttrium-stabilized zirconia, doped ceria, lanthanum calcium niobate, and samarium cerium yttrium zirconate. In some embodiments, the barrier layer is about 1 microns to 50 micron thick, or about 5 microns to 20 microns thick.

In some embodiments, the metal support comprises a low-silicon stainless steel including less than about 0.5 weight percent silicon. In some embodiments, the first proton-conducting ceramic and the second proton-conducting ceramic comprise barium cerium yttrium zirconate.

Additional processing techniques can be used to reduce or prevent silicon and chromium diffusion from the metal support, especially when the electrolyte layer comprises BZCY. In some embodiments, silicon and chromium are gettered from the metal support. The getter serves to capture the silicon and chromium before it diffuses to the electrolyte (especially a BZCY electrolyte). In some embodiments, a getter material (e.g., lanthanum oxide, strontium oxide, or barium oxide) is deposited on the metal support or the electrode, or otherwise incorporated with the electrode.

In some embodiments, a thickness of the electrode is about 10 microns to 100 microns, about 50 microns, or about 100 microns. A thick electrode can serve to reduce or minimize silicon and chromium diffusion into the electrolyte (especially a BZCY electrolyte). A thick fuel-side electrode can also serve to reduce or minimize silicon vapor from entering the atmosphere in which the thermal treatment is performed.

In some embodiments, a multilayer electrode including two different compositions of the same proton-conducting ceramic can be used to reduce or minimize silicon and chromium transport. For example, the fuel-side electrode may include a porous BZCYYb1711 layer to block chromium solid diffusion and to getter silicon and a porous BZCY721 layer to block silicon vapor with a dense BZCYYb4411 electrolyte disposed thereon.

In some embodiments, an in-situ technique (e.g., reactive sintering), can be used to form the electrolyte layer or the electrolyte layer and the electrode. Then, the thermal treatment temperature can be reduced, which in turn reduces the silicon and chromium diffusion rates.

In some embodiments, depositing additional material on the electrode after block 1715 (e.g., by infiltration or impregnation). In some embodiments, the material is added as a solution of precursor, which is then converted to the desired composition by thermal treatment, or as a powder (e.g., a fine powder). The material may be a catalyst (e.g., nickel or barium strontium cobalt ferrite), a proton conductor (e.g., a proton-conducting ceramic, such as barium cerium yttrium zirconate), or an electronic conductor (e.g., nickel or copper).

A specific embodiment of the method 1700 shown in FIG. 17 comprises forming an electrode on a metal support of a device with barium cerium yttrium zirconate. The metal support comprises a low-silicon steel including less than about 0.5 weight percent silicon. The barium cerium yttrium zirconate is in a powder form. An electrolyte layer is formed on the electrode and on the metal support of the device with the barium cerium yttrium zirconate. The device is then sintered at about 1200° C. to 1550° C. in a reducing atmosphere.

In some embodiments, the structure comprises additional layers of proton conductor or metal support to form a complete cell. For example an additional porous electrode layer is formed in contact with the electrolyte layer (metal support/porous electrode/dense electrolyte/porous electrode), or an additional porous electrode layer and additional metal support are formed (metal support/porous electrode/dense electrolyte/porous electrode/metal support).

The following examples are intended to be examples of the embodiments disclosed herein, and are not intended to be limiting.

EXAMPLE 1

The work to identify proton-conducting ceramics that are compatible with a co-sintering fabrication processing approach is described in EXAMPLE 1. It was anticipated that if a compatible family of proton-conducting oxides is identified, other limitations such as low conductivity or high sintering temperature could be overcome with focused effort. For barium cerium yttrium zirconate (BZCY) as an example, conductivity has been improved almost an order of magnitude (FIG. 2), and sintering temperature has dropped from approximately 1600° C. to 1350° C. after several years of global effort focused on doping and powder processing improvements. Here, we select representative compositions from several families of proton-conducting oxides and determine their suitability for co-sintering on stainless steel. Initially, we assessed whether they were compatible with (a) reducing atmosphere sintering and (b) direct contact with metal support during sintering. More detailed studies for the compatible compositions then included interdiffusion, densification behavior, and evaporation during sintering. Finally, thin layers of proton conductors supported on porous steel supports are prepared and electrochemically tested.

Candidate proton-conducting ceramics including perovskite oxides $BaZr_{0.7}Ce_{0.2}Y_{0.1}O_{3-\delta}$ (BZCY), $SrZr_{0.5}Ce_{0.4}Y_{0.1}O_{3-\delta}$ (SZCY), and $Ba_3Ca_{1.18}Nb_{1.82}O_{9-\delta}$ (BCN), pyrochlore oxides $La_{1.95}Ca_{0.01}Zr_2O_{7-\delta}$ (LCZ) and $La_2Ce_2O_7$ (LCO), and acceptor doped rare-earth orthoniobate $La_{0.99}Ca_{0.01}NbO_4$ (LCN) were investigated in this study. BZCY was commercially purchased. For other compositions, solid-state reaction and/or sol-gel methods were used to synthesize the powders.

(a) Solid state reaction method: SZCY, BCN, LCO, and LCN powders were successfully synthesized through solid-state reaction. Applicable oxides and carbonates ($SrCO_3$, $ZrO_2$, $CeO_2$, $Y_2O_3$, $BaCO_3$, $CaCO_3$, $Nb_2O_5$, and $La_2O_3$) were mixed in stoichiometric proportions and milled with 1 mm zirconia balls in isopropyl alcohol for 24 hours. $La_2O_3$ powder was calcined at 900° C. for 10 hours immediately before weighing to decompose hydroxide and carbonate. After ball milling, the suspensions were dried on a stir plate under a heat lamp. The resulting powder precursors were then calcined in air in the temperature range of 1050 to 1400° C. for duration of 5 to 10 hours. We also attempted to synthesize $La_{1.95}Ca_{0.05}Zr_2O_{7-\delta}$ (LCZ) via a solid-state reaction route, but the correct phase was not obtained.

(b) Sol-gel method: Since $La_{1.95}Ca_{0.05}Zr_2O_{7-\delta}$ (LCZ) was not successfully synthesized by the solid-state reaction route, sol-gel method was used. Stoichiometric amounts of $La(NO_3)_3 \cdot 6H_2O$, $Ca(NO_3)_2 \cdot 4H_2O$, and $ZrO(NO_3)_2 \cdot xH_2O$ were mixed with citric acid $(HOC(COOH)(CH_2COOH)_2 \cdot H_2O)$ in deionized water. Citric acid/metal molar ratio was 1:1. The solution was stirred and heated on a hot plate at 80° C. until a viscous liquid was obtained. The viscous liquid was then dried in an oven at 100° C. for 5 h, followed by 110° C. for 5 h, until a porous solid mass was obtained. The solid mass was ground in an agate mortar and calcined at 900° C. for 5 h, after which fine LCZ powder was formed. Similar sol-gel method was also used to successfully obtain fine powders of SZCY, BCN, and LCN.

After powders of proton conductors were synthesized and phases were confirmed with X-ray diffraction (XRD), the powders were pressed into pellets with fish oil and polyvinyl butyral as binders (diameter of ~6.35 mm, thickness of 2 mm). The sintering behaviors of the pellets were examined using a vertical dilatometer. Uniaxial shrinkage of the pellets was measured as a function of temperature up to 1450° C., in both dry air or 2% $H_2$—Ar (reducing) environments.

The pellets were also sintered in air (muffle furnace) or reducing environment ($Al_2O_3$ tube furnace with 2% $H_2$—Ar flow), without any compression. The shrinkage, weight loss via evaporation, and sintered density of the pellets were obtained by measuring the dimensions and weight before and after sintering. The sintered pellets were examined by scanning electron microscopy (SEM) and energy X-ray dispersive spectroscopy (EDS) to evaluate their grain size, porosity, and composition change.

To evaluate the compatibility with the metal support during co-sintering, powders of the proton conductors were mixed with acrylic paint medium brushed onto bisque fired metal support (P434L Stainless Steel, fired at 1050° C. in reducing atmosphere to obtain some mechanical strength). The resulting bilayers were then fired in air at 525° C. to remove acrylic and then sintered in reducing atmosphere (2% $H_2$—Ar) at 1450° C. for 2 h. The ceramic layers were then analyzed with SEM, EDS and XRD, in order to image microstructures and determine the extent of composition change or element interdiffusion.

Complete metal-supported half-cells were fabricated with LCN, SZCY, and BZCY electrolytes and electrode backbones. Commercially available ferritic stainless steel P434L alloy (water atomized) with composition of 17 wt. % Cr, 0.20 wt. % Mn, 1.0 wt. % Mo, 0.010 wt. % P, 0.90 wt. % Si, 0.020 wt. % S, 0.020 wt. % C and the balance in Fe, was used as the metal support material. A green metal support sheet was tape-cast and cut into 30 mm diameter circles using a laser cutter. The circular supports were fired in a box furnace at 525° C. for 1 h to remove the binder and pore former and bisque fired in a tube furnace at 1050° C. for 2 h with 2% $H_2$—Ar flowing (reducing environment) to provide mechanical integrity for further ceramic deposition. Three layers of selected protonic ceramic powders were applied sequentially, including (a) a hand-painted porous bridging layer for bridging the pores on the metal support surface and providing a smoother surface for subsequent layers, (b) a hand-painted porous electrode layer with fine pores for catalyst infiltration and obtaining a smooth surface for electrolyte deposition, and (c) an aerosol sprayed dense electrolyte. After the deposition of the ceramic layers, cells were fired in air at 525° C. for 1 h to remove acrylic, pore formers, and residual solvent. Cells were then sintered at various sintering temperatures for 2 h in 2% $H_2$—Ar environment.

Cells with dense and crack-free electrolyte (confirmed by surface SEM and leak test with ethanol) were subjected to electrochemical testing. SDC mixed with 20 vol. % Ni (SDCN catalyst) was infiltrated into the pores of the hydrogen electrode using precursor solutions of nitrate salts, with the help of mild vacuum. On top of the electrolyte, Pt paste was painted as air electrode (with area of ~0.9 cm$^2$) and fired at 850° C. for 30 min. Pt mesh and wires were used for current application and voltage probing. For electrochemical testing, the cell was mounted on an alumina tube with ceramic paste. After the ceramic paste was cured, 3% humidified hydrogen (50 sccm) was flowed to the SDCN infiltrated electrode to reduce NiO to Ni. The Pt electrode was exposed to ambient air. Cell impedance was measured as a function of temperature, using electrochemical impedance spectroscopy (EIS) at open-circuit condition (with amplitude of 5 mV, from 200 kHz to 100 mHz) using a potentiostat.

The proton conductor phases after calcination, air sintering, reducing atmosphere sintering, and co-sintered on metal-support were examined by XRD using an X-ray diffractometer with CuKα radiation. The ceramic pellets and metal-supported cells were characterized by SEM and EDS.

As candidates for co-sintering with ferritic stainless steel, we selected proton conducting oxides with (a) reported sintering temperature in the range 1200 to 1600° C. to be close to the sintering temperature range for ferritic stainless steel of 1250 to 1500° C., and (b) conductivity of approximately $10^{-3}$ S cm$^{-1}$ or higher at 700° C. to enable reasonable resistance for an electrolyte layer of at least several microns thickness that can be produced by low-cost methods such as screen printing or tape casting (FIG. 2). The specific selected compositions are listed in Table 1. BZCY, LCN, LCO, and BCN have been successfully integrated into an operating fuel cell, and various BZCY and SZCY compositions have been used in steam electrolysis cells. LCZ was demonstrated in an ammonia synthesis cell. To date, none of these have been demonstrated in a co-sintered metal-supported cell.

exposure at 850° C. or lower, to avoid oxidation of the metal support in a complete cell. Re-oxidizing LCO in air at 850° C. did indeed recover the correct phase, although the pellet shattered, presumably due to volume expansion arising from oxygen uptake. In contrast, LCZ remained decomposed after re-oxidation, and therefore was eliminated from further consideration.

The remaining candidates were assessed for reactivity with stainless steel under sintering conditions. Thin layers of ceramic powder were painted onto metal supports, and co-sintered at 1450° C. in reducing atmosphere. Evaporative loss of ceramic cations and diffusion of elements from the

TABLE 1

Summary of screening results for proton conductors suitable for co-sintering fabrication of metal supported cells.

| Family | Candidate | Representative Composition | Survives sintering in reducing atmosphere? | Survives re-oxidation? | React with Metal? | Densifies at 1450° C. or lower? | Evaporation during sintering? |
|---|---|---|---|---|---|---|---|
| Pyrochlore | LCZ | $La_{1.95}Ca_{0.05}Zr_2O_7$ | NO | NO | — | — | — |
|  | LCO | $La_2Ce_2O_7$ | NO | YES | YES - Cr, Si | — | — |
| Perovskite | BCN | $Ba_3Ca_{1.18}Nb_{1.82}O_9$ | YES | YES | YES - Cr, Si | Falls apart | YES |
|  | BZCY | $BaZr_{0.7}Ce_{0.2}Y_{0.1}O_3$ | YES | YES | YES - Cr, Si | Marginal | YES |
|  | SZCY | $SrZr_{0.5}Ce_{0.4}Y_{0.1}O_3$ | YES | YES | YES - Si | YES | YES |
| Acceptor doped rare-earth orthoniobate | LCN | $La_{0.99}Ca_{0.01}NbO_4$ | YES | YES | NO | YES | NO |

The approach taken here was rapid down-selection from the list of candidates, screening for compatibility with processing conditions and contact with stainless steel metal support, as discussed below. Compositions that showed a major limitation at each stage of screening were removed from further consideration. Table 1 summarizes the screening effort.

Starting powders were prepared by solid state reaction, with the exception of BZCY (purchased commercially) and LCZ. For LCZ, the correct phase was not obtained by solid state reaction in the range 1100 to 1400° C., so it was prepared by sol-gel synthesis instead. XRD confirmed that the intended phase was obtained for each of the fresh powders after synthesis, as the peak patterns are consistent with previous literature (FIGS. 3A-3F). The SZCY powder also contained minor $CeO_2$ and $SrY_2O_4$ impurity phases. The peak splitting for BCN is consistent with previous work, where it was suggested that hydrated and dehydrated phases coexist at 1200° C. and heating to 1300° C. and above completely dehydrates the material resulting in single peaks.

Figure 3A:
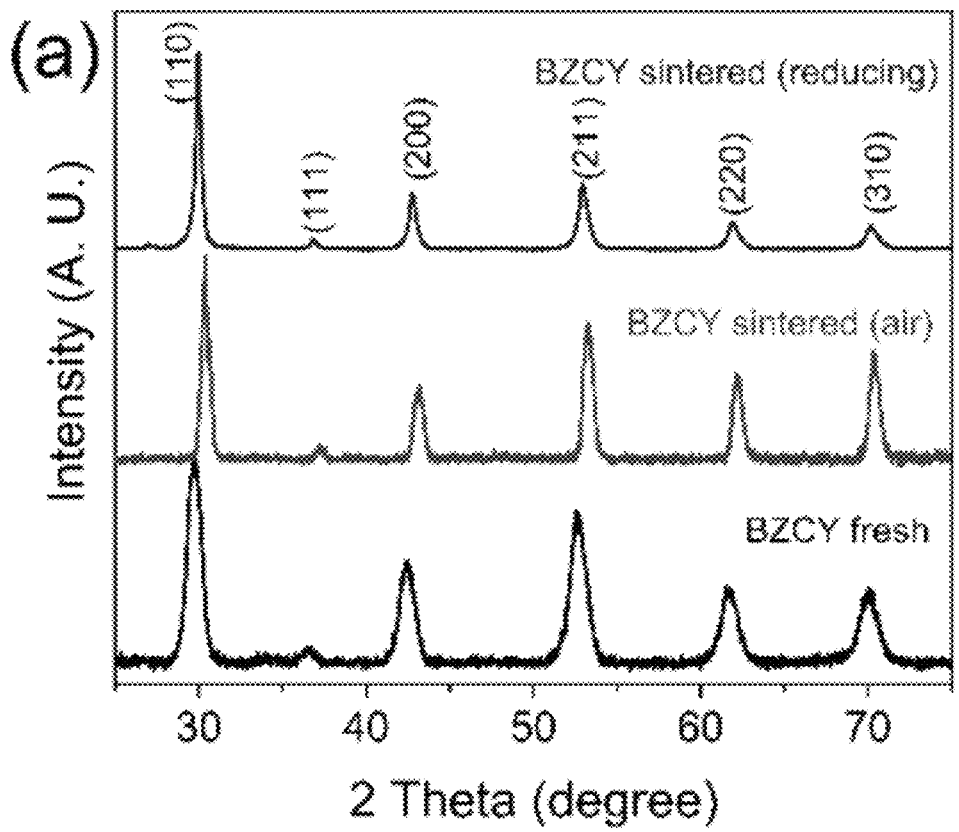
FIGS. 3A-3F show XRD patterns of powders as synthesized (fresh), after air sintering at 1450° C., and after reducing atmosphere sintering at 1450° C.
Figure 3D:
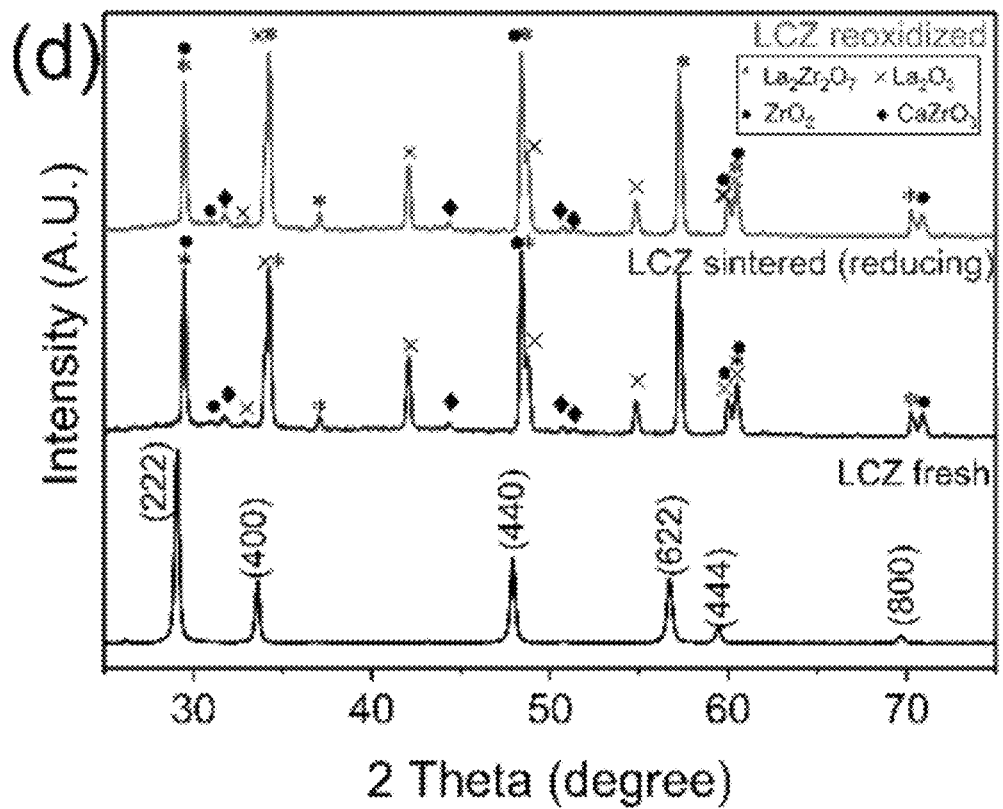
Figure 3B:
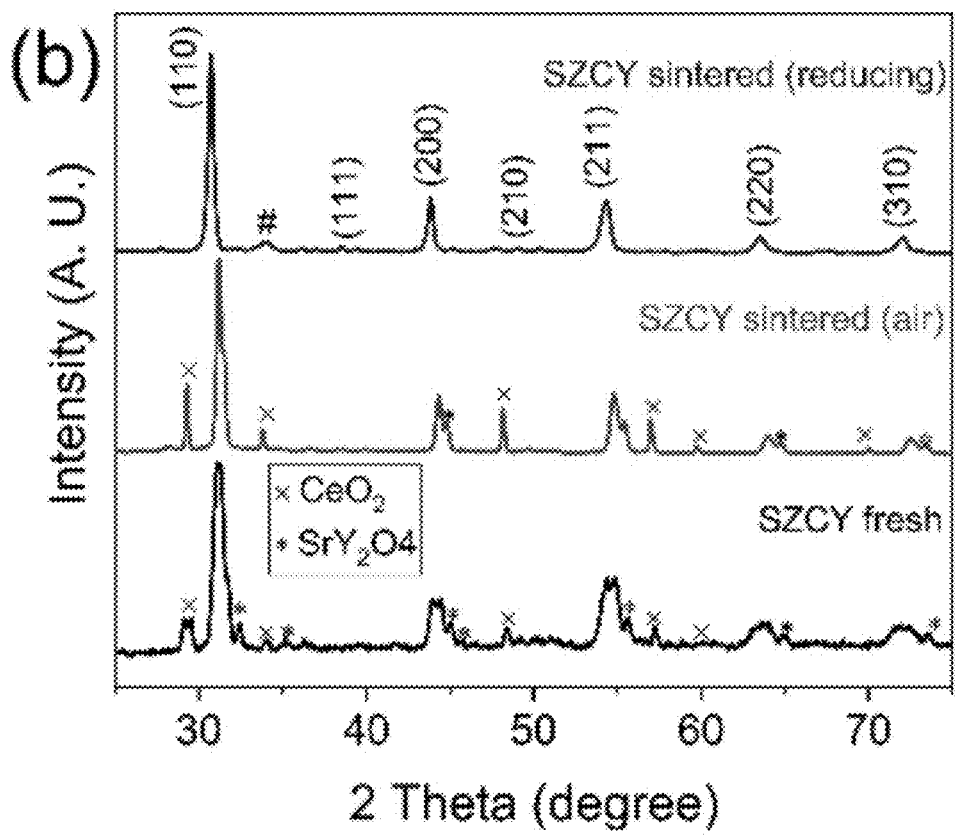
Figure 3E:
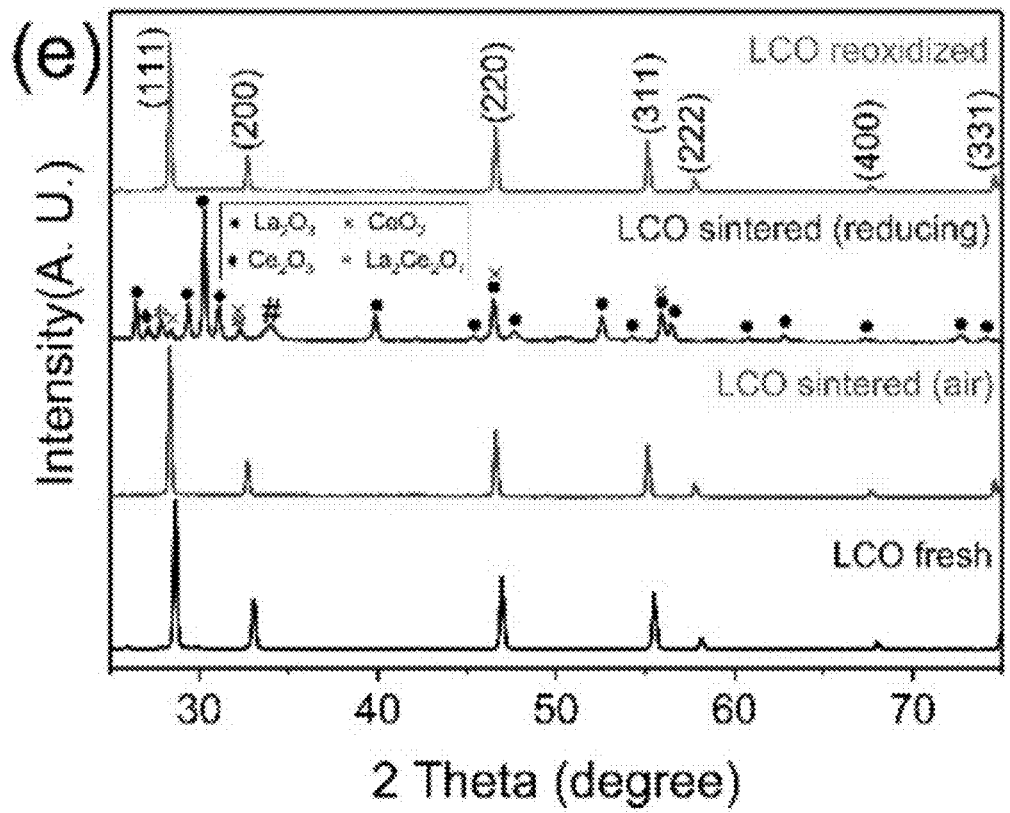
Figure 3C:
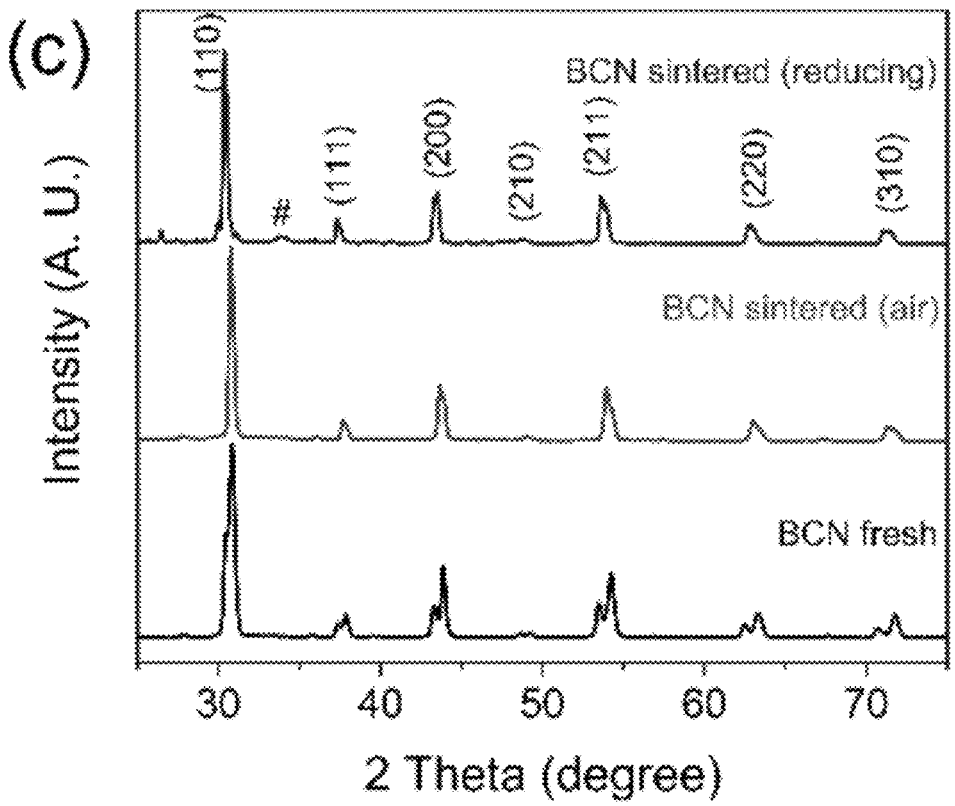
Figure 3F:
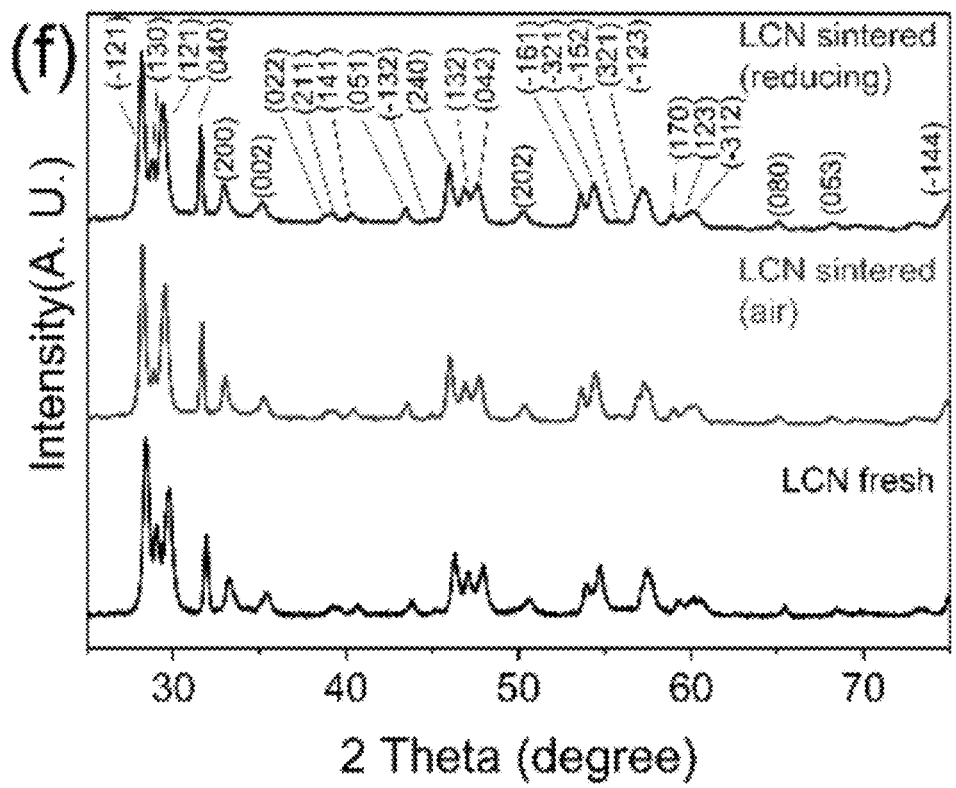
Figures 4F, 4G, 4H, 4I, 4J:
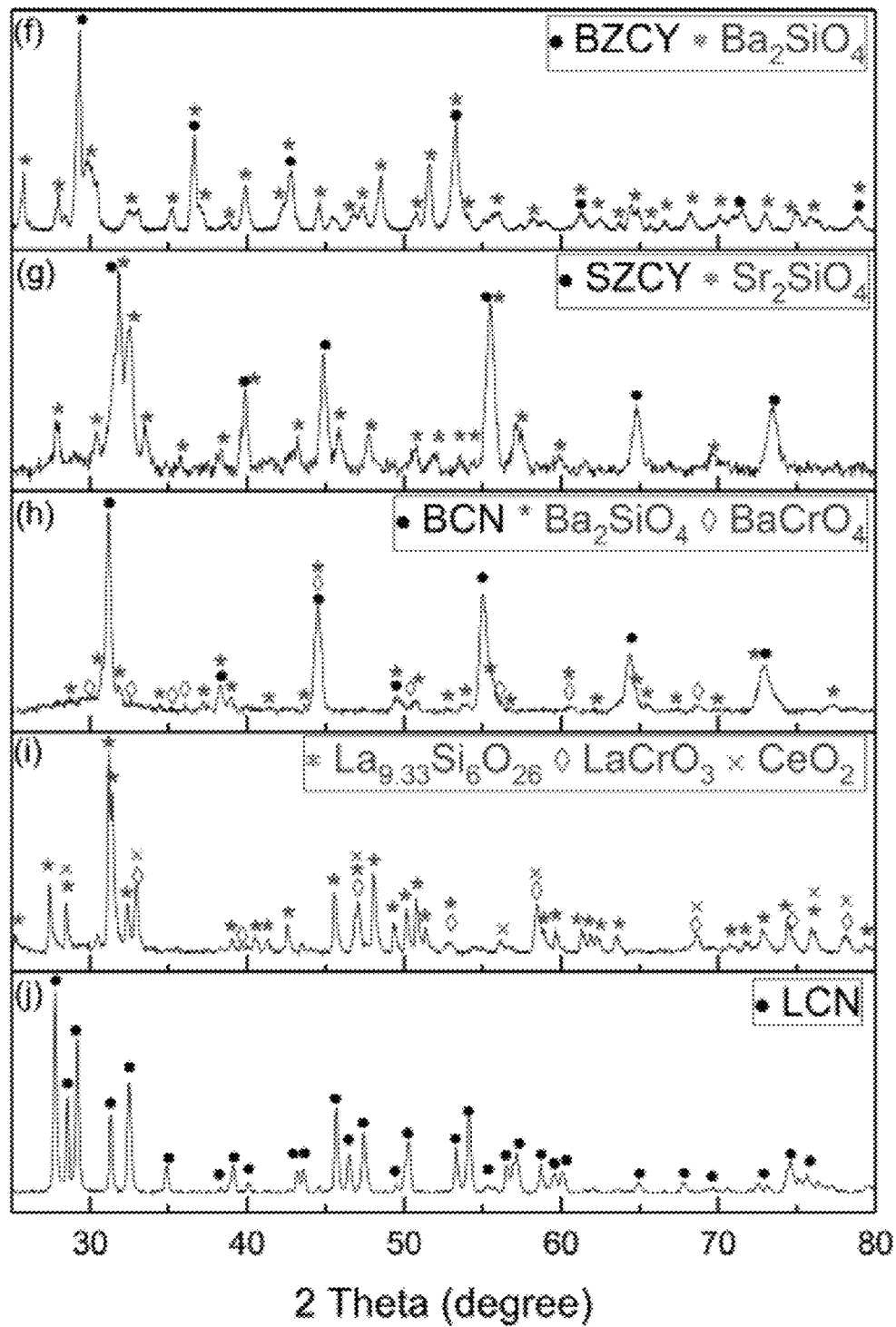

A high sintering temperature is desirable for ceramic densification, but the porous metal support will over-densify near the melting point of the stainless steel (~1525° C.). Therefore, a nominal sintering temperature of 1450° C. was selected for screening. This is 100° C. higher than the sintering temperature used for YSZ-stainless steel cells, but still results in adequate porosity in the metal layer as is shown below. Pellets of the ceramic powders were exposed to reducing atmosphere at 1450° C. to assess phase stability in the sintering conditions, and to air for comparison. Ideally, the desired phase remains after sintering in both air and reducing exposure, and this was found to be the case for BZCY, SZCY, BCN, and LCN. Both LCO and LCZ showed significant decomposition to constituent oxides when exposed to reducing atmosphere (FIGS. 3A-3J). It is possible to anneal the decomposed ceramics in air to regain the correct phase, however this re-oxidation step is limited to metal into the ceramic were determined with EDS (FIGS. 4A-4E), and reaction product phases on the surface of the ceramic were determined with XRD (FIGS. 4F-4J). Ba and Sr loss was observed for BZCY, SZCY, and BCN, as evidenced by a decrease in Ba or Sr EDS peak intensity after sintering these compositions. This is consistent with previous reports of Ba loss during sintering of barium zirconate via evaporation, which is detrimental to proton conductivity. In addition to Fe and Cr, 434 stainless steel contains Mo, Si, and Mn. Si diffused into BZCY, forming $Ba_2SiO_4$ on the surface of the ceramic (FIG. 4F). Cr diffusion was also observed, although it was limited to the region close to the metal: Y—Cr and Ce—Cr rich phases (presumably $YCrO_3$ and $CeCrO_3$) were detected near the metal with EDS but did not appear in the surface XRD analysis. Similarly for SZCY, $Sr_2SiO_4$ was observed on the surface of the ceramic (FIG. 4G), and for BCN, $Ba_2SiO_4$ and $BaCrO_4$ were observed (FIG. 4H). Interdiffusion of Si and Cr is clearly an issue for BZCY, SZCY, and BCN, although the desired proton-conducting phases were still dominant after co-sintering. In contrast, LCO reacted completely with the metal. Upon decomposition to La-oxide and Ce-oxide, the La-oxide further reacted with Cr and Si from the metal, forming $La_{9.33}Si_6O_{26}$ and $LaCrO_3$; no residual LCO phase was observed (FIG. 4I). LCO was therefore eliminated from further consideration. LCN is the only composition that survives reducing atmosphere, does not lose cations to evaporation, and did not react with the metal support.

For compatibility with co-sintering on metal support, the ceramic layer will ideally densify completely at 1450° C. or below, with shrinkage somewhat less than the bare metal (~20%) and minimal change in composition due to evaporation. Pellets of the remaining candidate ceramics were sintered in reducing atmosphere to determine general densification and evaporation behavior (Table 2). BCN showed low shrinkage, and high weight loss due to Ba evaporation during sintering (Ba evaporation was identified by EDS).

Figures 5A, 5B, 5C, 5D:
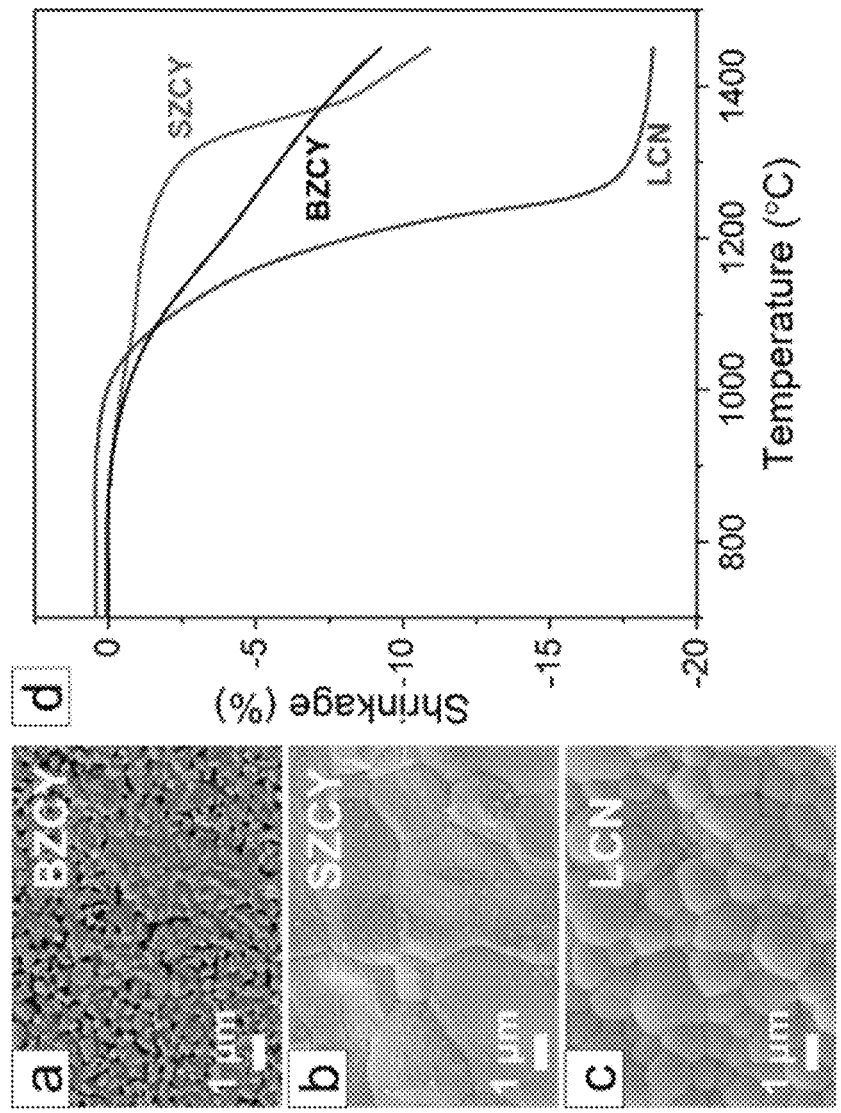
FIGS. 5A-5C show sintered microstructures—surface SEM micrographs of FIG. 5A—BZCY, FIG. 5B—SZCY, and FIG. 5C—LCN pellets after sintering in reducing atmosphere (2% $H_2$—Ar) at 1450° C. for 2 h.
FIG. 5D shows sintering profiles—dilatometry of BZCY, SZCY, and LCN pellets sintered in reducing atmosphere (2% $H_2$—Ar) up to 1450° C.

The sintered BCN pellet was only 57% dense, and disintegrated into powder within hours of being removed from the sintering furnace. Therefore, BCN was eliminated from further consideration. BZCY showed suitable shrinkage and moderate loss of Ba, but only achieved 73% densification. Significant residual porosity is evident in the microstructure of the sintered pellet (FIG. 5A). This is not surprising, as BZCY is typically sintered at 1500-1600° C. Recent work indicates that addition of sintering aids, modification of the composition, and use of a reactive sintering approach can all lead to complete densification in air below 1500° C. Therefore, we anticipate that with future effort these approaches will enable densification in reducing atmosphere as well. LCN and SZCY both showed suitable shrinkage and achieved almost complete densification. SZCY displayed moderate evaporation of Sr (Table 2), whereas LCN did not experience weight loss during sintering. The sintered SZCY and LCN pellets had well-formed micron-scale grains and minimal residual porosity (FIGS. 5B and 5C).

TABLE 2

Sintering behavior. Shrinkage, weight loss, and density of pellets after sintering in reducing atmosphere (2% $H_2$—Ar) at 1450° C. for 2 h.

| Composition | Shrinkage (%) | Weight loss (%) | Sintered density (g/cm$^3$) | Density (% of theor.) |
|---|---|---|---|---|
| BZCY | 18 | 6 | 4.5 | 73 |
| SZCY | 14 | 9 | 5.3 | 97 |
| BCN | 6 | 17 | 3.2 | 57 |
| LCN | 19 | 0 | 5.8 | 99 |

To further elucidate sintering behavior, dilatometry of BZCY, SZCY, and LCN was conducted in reducing atmosphere (FIG. 5D). BZCY sintering started around 900° C. and continues gradually to 1450° C. A plateau indicating completion of sintering was not observed, consistent with the residual porosity and incomplete densification discussed above. SZCY sintering was delayed relative to BZCY, but proceeded quickly above about 1300° C. LCN showed a classic sintering curve, with incipient sintering around 950° C., followed by continuous shrinkage leading to a plateau indicating that sintering was nearly complete at 1300° C. and above. This result prompted the sintering temperature study discussed below. In general, the sintering behavior of these materials in reducing atmosphere is quite similar to that in air. Sintering was delayed by about 50° C. in reducing atmosphere for both SZCY and LCN, and minimal impact was seen for BZCY.

In summary, the sintering behavior of SZCY and LCN appear to be compatible with co-sintering on metal support, and BZCY is expected to be suitable as well with some additional effort.

Because SZCY and LCN have good sinterability at temperature ≤1450° C., they were selected for metal-supported cell fabrication. Cell fabrication with BZCY was also attempted despite incomplete densification at 1450° C. because of its higher proton conductivity.

Figures 6A, 6B:
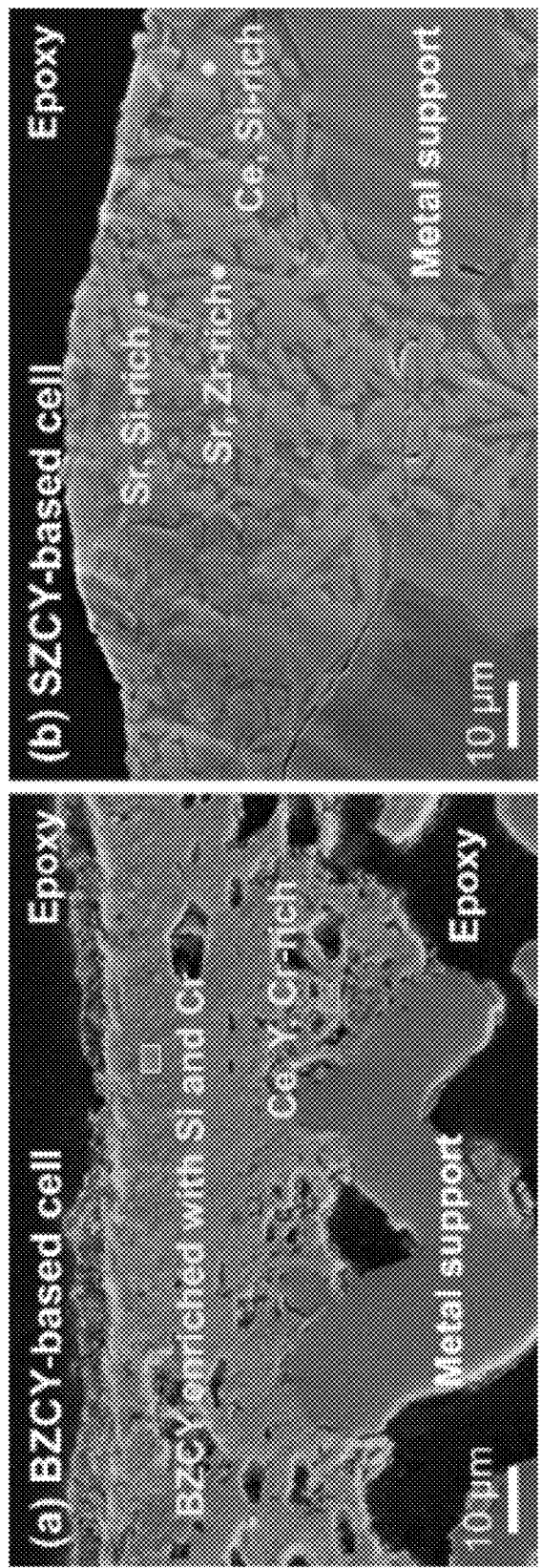
FIGS. 6A and 6B show co-sintered BZCY and SZCY cells. Cell structure with FIG. 6A—BZCY and FIG. 6B—SZCY electrode-electrolyte after sintering at 1450° C.

FIGS. 6A and 6B show the cross-sectional SEM images of the cells based on BZCY and SZCY. EDS spectra were obtained from the indicated points/areas. The cell microstructure can be summarized as follows:

(a) BZCY: Cr and Si diffusion from metal support was identified to be the main issue for BZCY. EDS analysis obtained in the vicinity of metal support shows this area is enriched with Ce, Y, Cr, and almost Ba and Zr depleted. In the area close to BZCY surface, amount of Cr becomes smaller. In addition to Cr, minor Si diffusion was also observed throughout the BZCY layers, with a concentration of ~1 atomic %. It is also worth mentioning that BZCY co-sintered with metal support was found to be surprisingly denser than BZCY pellet, although some cracks were observed in the electrolyte. The denser structure of BZCY layers may result from co-shrinking of the metal support, which enhances the densification of co-sintered BZCY layers. Cr and Si, although considered to be detrimental, could act as reactive sintering aids.

(b) SZCY: After co-sintering, a significant penetration of ceramic layers into the metal support was observed and porosity in the metal support became very small. Significant Si diffusion from metal support was observed. At least three different phases can be distinguished by SEM/EDS: a Si, Ce-rich brighter phase, a Si, Sr-rich darker phase, and a Sr, Zr-rich (Ce-deficient) brighter phase with hexagonal structure. Cr diffusion was smaller in SZCY compared to BZCY (minor Cr was observed).

Since BZCY and SZCY were found to react with the metal support during co-sintering, further cell fabrication and testing with these two materials were not pursued.

Figures 7A, 7B:
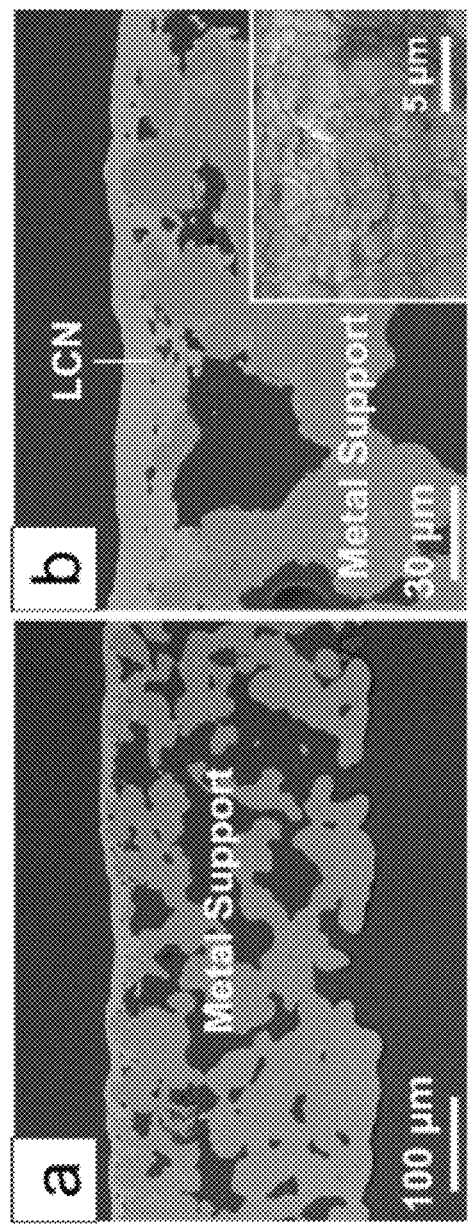
FIGS. 7A and 7B show the structure with LCN electrode-electrolyte after sintering at 1300° C. Inset image shows the surface morphology of the LCN electrolyte.

LCN did not react with the metal support and can be sintered at temperature lower than 1450° C. To obtain a cell structure with dense electrolyte and appropriate porosities of the metal support and electrode backbone (for catalyst infiltration and gas diffusion), the sintering temperature for LCN-based cells was varied from 1250 to 1450° C. 1300° C. was found to be optimal, providing a dense electrolyte with thickness of ~10 μm and metal support with porosity of ~36% (estimated using software) (FIGS. 7A and 7B). In comparison, the cell sintered at 1250° C. showed cracks in the electrolyte and minimal sintered connection within the metal support, and cells sintered at 1350° C. or higher showed agglomeration and pore-filling of LCN in the metal support and significant densification of the metal support. Therefore, 1300° C. was chosen to be the best sintering temperature for LCN-based cell.

Figure 8A:
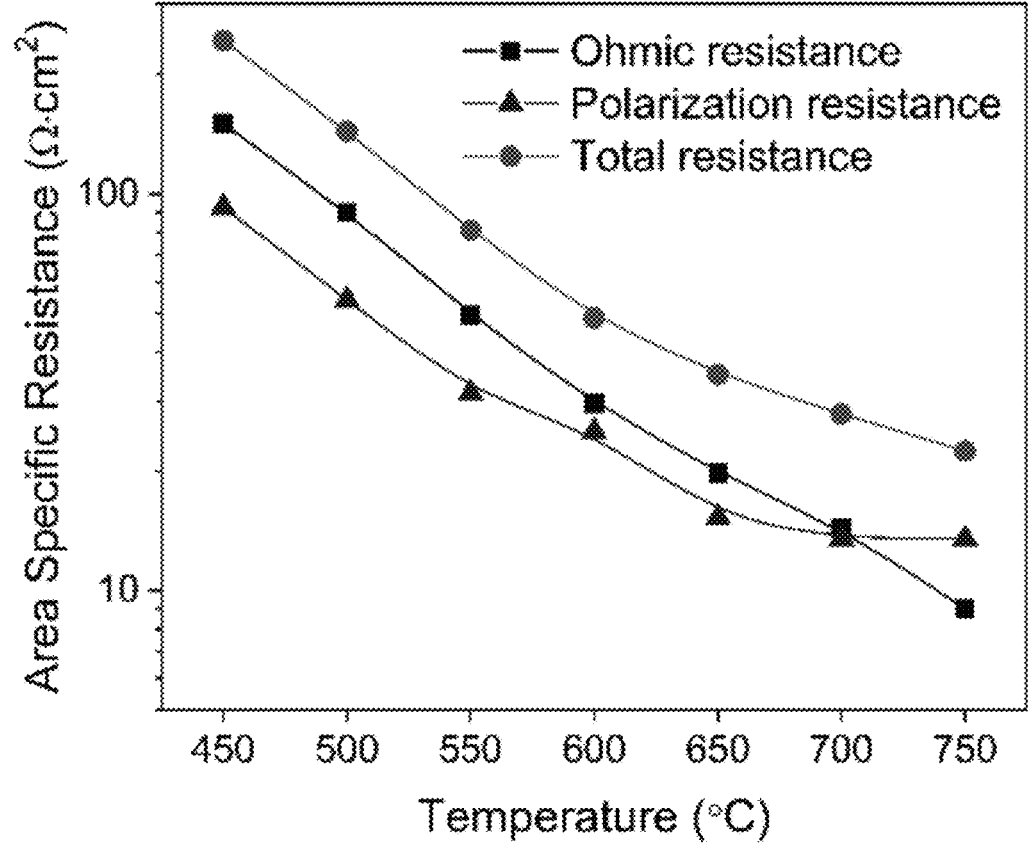
FIG. 8A shows the ohmic, polarization, and total resistance of the LCN-based cell as a function of temperature, with 3% $H_2O$—$H_2$ on metal support side and ambient air on Pt side.
Figure 8B:
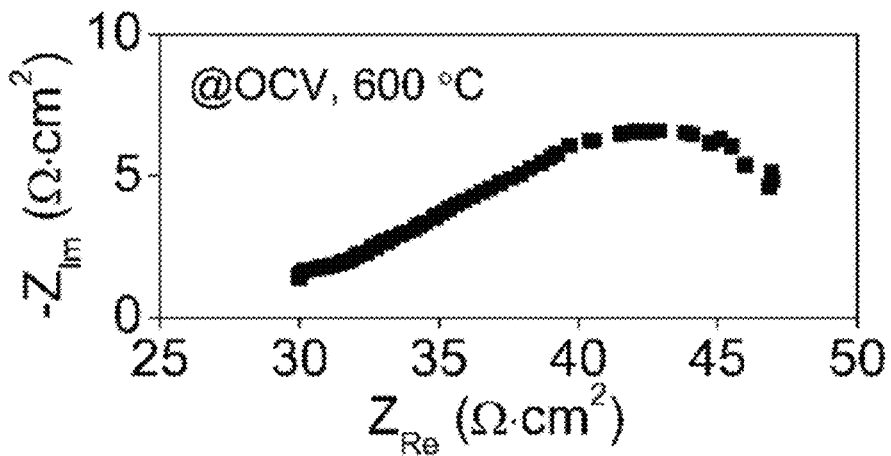
FIG. 8B shows the impedance spectra measured at 600° C. under open-circuit condition.
Figures 9A, 9B, 9C, 9D:
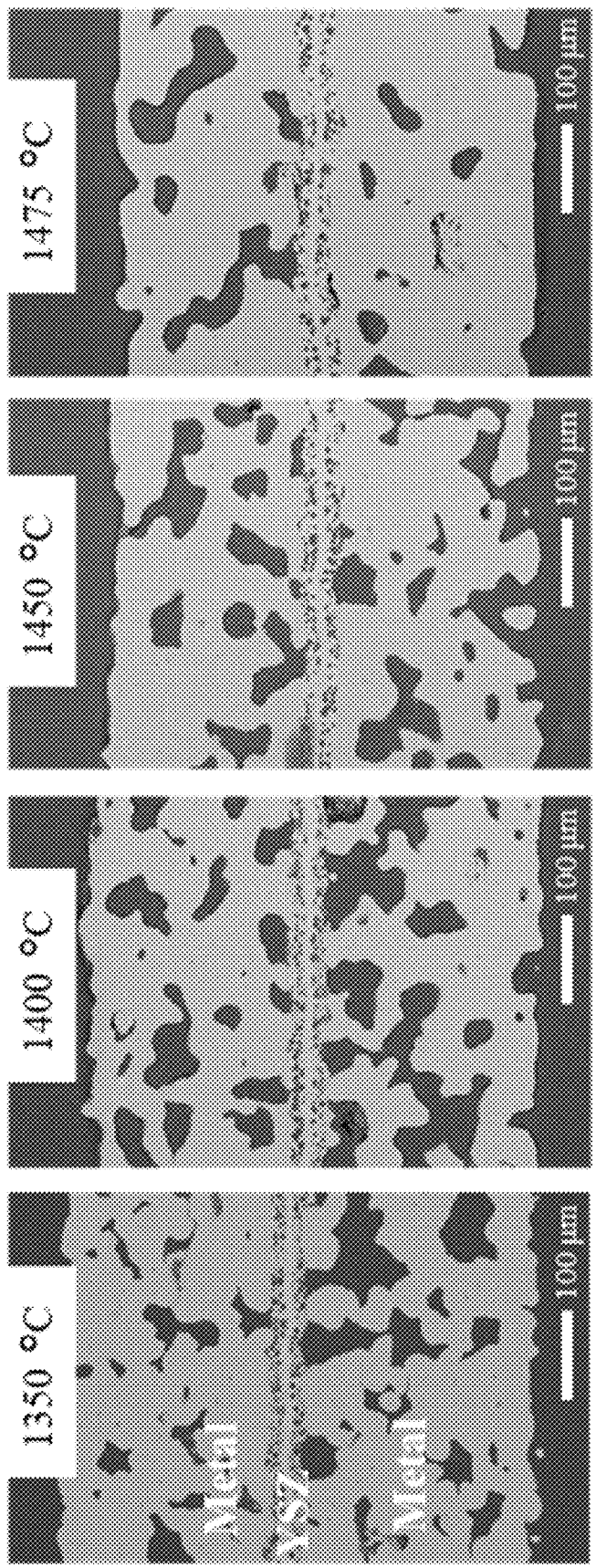
FIGS. 9A-9D show SEM cross-section images of symmetric MS-SOC structure with YSZ ceramic layers after sintering for 2 h at 1350, 1400, 1450, and 1475° C.
Figure 10A:
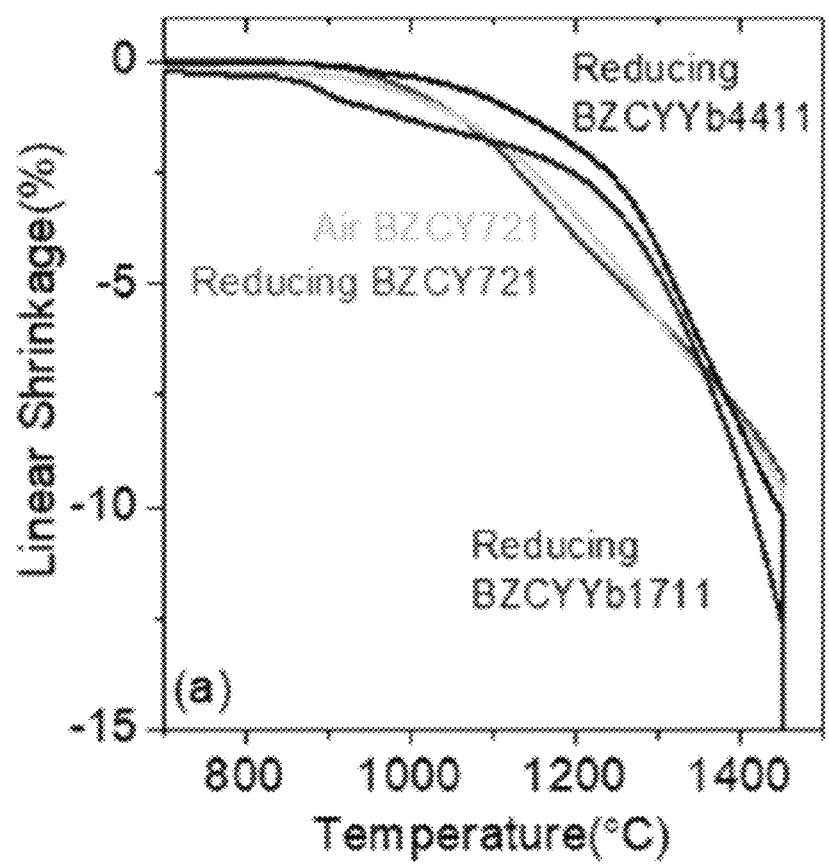
FIGS. 10A-10D show the sintering behavior of BZCY721, BZCYYb4411, and BZCYYb1711.
Figure 10B:
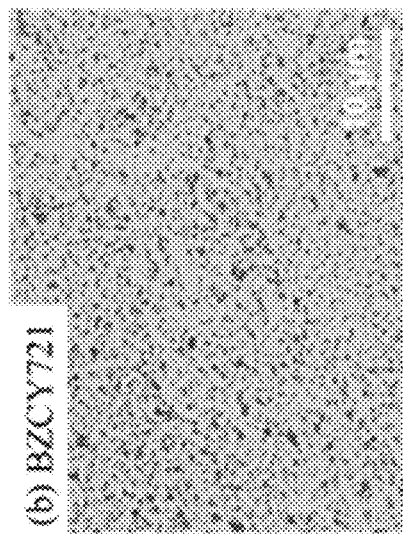
Figure 10C:
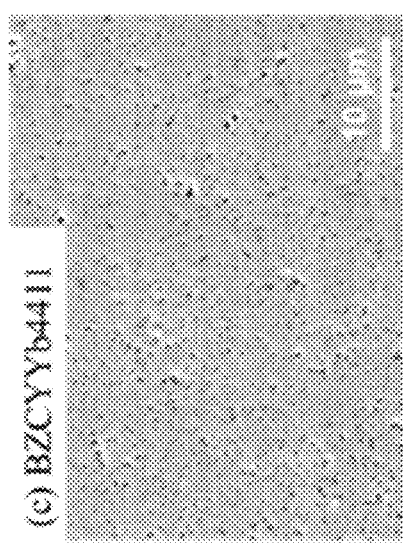
Figure 10D:
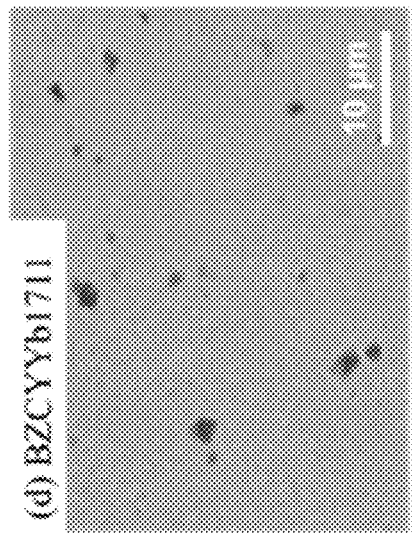

Fabrication was completed for a LCN-based cell sintered at 1300° C., by infiltrating SDCN catalyst into the LCN backbone on the metal support side, and applying Pt paste on the LCN electrolyte. The single cell had diameter of 25 mm and active area of 0.9 cm$^2$. Initial electrochemical testing was performed in the range 450 to 750° C. The open-circuit voltage (OCV) at 700° C. was approximately 1.02 V, which is lower than the theoretical value of 1.12 V, suggesting some leakage through the electrolyte of the present cell, but higher than the values reported in the literature for cells based on LCN electrolyte. FIG. 8A shows the ohmic, polarization and total impedance of the cell as a function of temperature, determined with EIS. At 600° C., the ohmic resistance ($R_\Omega$) and total resistance ($R_{total}$) were approximately 30 and 50 Ω·cm$^2$, respectively (FIG. 8B). Based on a thickness of 10 μm, the conductivity of metal supported LCN electrolyte was calculated to be approximately 3.7× 10$^{-4}$ S cm$^{-1}$ at 600° C., which is in agreement with the values of pellets reported in the literature. The relatively large $R_\Omega$ is ascribed to the low conductivity of LCN and could be reduced by decreasing electrolyte thickness or improving conductivity via doping. The polarization resistance ($R_p$) was smaller than $R_\Omega$ below 650° C., and plateaued above 650° C. In this example, Pt paste was used as the electrode on the air-side and SDCN catalyst from high temperature SOFC was adopted on the fuel side. $R_p$ can be further reduced if improved materials are used as the oxygen and hydrogen catalysts. Note that we did not observe an obvious discontinuity in area specific resistance (ASR)

related to the phase transition between monoclinic at lower temperature and tetragonal at higher temperature expected for LCN around 520° C. However, differing linear thermal expansion coefficients of the monoclinic ($8.6\pm0.5\times10^{-6}$/K) and tetragonal phases ($15\times10^{-6}$/K) could present a challenge for metal support/interconnect materials selection. Advantages of MSCs such as rapid startup and dynamic temperature operation could undermined, as micro-cracks may develop in the LCN electrolyte if the temperature ramping rate is too fast or temperature gradients are too large.

In this example, representative protonic ceramics including BZCY, SZCY, BCN, LCZ, LCO, and LCN were assessed for viability as the electrolyte material in metal-supported solid oxide cells fabricated by co-sintering. The candidates were screened for compatibility with reducing atmosphere sintering, chemical compatibility with metal support during co-sintering, sintering behavior and evaporation during sintering. LCZ did not survive reducing atmosphere sintering. LCO completely reacted with the metal support. BCN evaporated dramatically and disintegrated into loose powder after sintering. LCZ, LCO, and BCN are therefore concluded to be incompatible with co-sintering fabrication of MSC based on ferritic stainless steel. Although BZCY and SZCY survived the processing conditions and have good ionic conductivity, they partially react with Si and Cr in the metal support, causing formation of secondary phases and Ba/Sr depletion. BZCY also requires a high sintering temperature, which limits compatibility with metal support.

Of the candidates studied here, LCN is identified to be the most compatible proton conducting material for co-sintering with metal support, as it can be densified at relatively low temperature (1300° C.), does not evaporate during sintering, and most importantly does not react with the metal support. A metal-supported single cell with LCN electrolyte was successfully fabricated by co-sintering and preliminary electrochemical testing was performed. The cell ohmic impedance is consistent with the reported conductivity of LCN and is too high to be practical for fuel cell or electrolysis cell application. The impact of the LCN phase transition requires further investigation. Further optimization of the cell should include reduction of electrolyte thickness, improvement of electrolyte conductivity, and optimization of the electrodes.

Example 2

The effort described in Example 1 to screen a wide variety of proton conducting ceramics for compatibility with co-sintering on ferritic stainless steel revealed that BZCY survives sintering in reducing atmosphere (required to avoid oxidation of the stainless steel), but reacts deleteriously with the metal support. In particular, a large amount of Si and minor amount of Cr from the stainless steel migrated into the BZCY layers. After sintering, the electrolyte layer was composed of a mixture of BZCY and a significant amount of $Ba_2SiO_4$. Furthermore, BZCY achieved only 73% of theoretical density and experienced significant Ba evaporation after sintering at 1450° C. in reducing atmosphere.

Here, we explored these challenges in more detail and several approaches to overcome them. The impact of Ce:Zr ratio in BZCY, sintering temperature, stainless steel composition, and addition of a Si-diffusion barrier layer were explored.

Complete symmetric MS-SOFCs with yttria-stabilized zirconia (YSZ) ceramic layers were prepared by tape casting, debinding in air, and sintering in reducing atmosphere (2% hydrogen in argon). Catalysts were not added. These cells were sintered at various temperatures to investigate the impact of sintering temperature on the metal support structure, in order to select an appropriate maximum sintering temperature for cells with BZCY electrolyte.

BZCY721 ($BaZr_{0.7}Ce_{0.2}Y_{0.1}O_{3-\delta}$) powder, BZCYYb4411 ($BaZr_{0.4}Ce_{0.4}Y_{0.1}Yb_{0.1}O_{3-\delta}$) powder, BZCYYb1711 ($BaZr_{0.1}Ce_{0.7}Y_{0.1}Yb_{0.1}O_{3-\delta}$) powder, and CGO (10 mol % gadolinium-doped ceria) powder were obtained. Commercial powders were used as sintering aids: $Co_3O_4$, ZnO, NiO (all <50 nm) and LiF (<10 μm). Sintering aid powders were used as-received, with the exception of LiF, which was attritor milled with isopropyl alcohol for 1 h to reduce particle size before use. Manganese oxide sintering aid was prepared by converting manganese nitrate to oxide in air by heating above 500° C. Commercially available ferritic stainless steel P434L alloy (water atomized) was used as the standard metal support material for all experiments unless otherwise noted. A low-Si 70Fe30Cr was used as an alternative (Table 3).

TABLE 3

| | Composition of metal support alloys (wt %). | | | | | | | |
|---|---|---|---|---|---|---|---|---|
| | Fe | Cr | Mo | Si | Mn | P | C | S | O |
| P434L | Bal | 16.66 | 0.94 | 0.85 | 0.14 | 0.016 | 0.012 | 0.006 | — |
| 70Fe30Cr | Bal | 29.41 | — | 0.46 | 0.16 | 0.01 max | 0.022 | 0.011 | 0.99 |

Ceramic powders were ball-milled in isopropyl alcohol with fish oil and polyvinyl butyral as binders, dried, sieved to <150 μm, and pressed into pellets (diameter of ~6.35 mm, thickness of ~2 mm). Sintering aids were added at 2 wt % loading during ball milling. Sintering behavior of the pellets was examined using a vertical dilatometer. Uniaxial shrinkage of the pellets was measured as a function of temperature up to 1450° C., in both dry air or 2% $H_2$—Ar (reducing) environments, both gases used straight from the cylinder without additional drying.

Pellets and thin films of ceramic were also sintered in air (muffle furnace) or reducing environment (tube furnace with 2% $H_2$—Ar flow at 100 mL min$^{-1}$), without any compression. Thin films were prepared by brush-painting a mixture of ceramic powder and acrylic binder onto a dense YSZ substrate. The shrinkage, weight loss via evaporation, and sintered density of the pellets were obtained by measuring the dimensions and weight before and after sintering. Sintered ceramics were examined by scanning electron microscopy and energy X-ray dispersive spectroscopy to evaluate their grain size, porosity, and composition change. Si and Cr contents were averaged over the entire thickness of the ceramic layer, except where noted.

Complete metal-supported half-cells were fabricated with BZCY electrolyte and electrode backbone. A green metal support sheet was tape casted and cut into 30 mm diameter circles using a laser cutter. The circular supports were fired in a box furnace at 525° C. for 1 h to remove the binder and pore former and bisque fired in a tube furnace at 1050° C. for 2 h with 2% H$_2$—Ar flowing (reducing environment) to provide mechanical integrity for further ceramic deposition. Three layers of ceramic powders were applied sequentially, including (a) a BZCY hand-painted porous bridging and barrier layer for bridging the pores on the metal support surface, providing a smoother surface for subsequent layers (b) a BZCY hand-painted porous electrode layer with fine pores for catalyst infiltration and obtaining a smooth surface for electrolyte deposition, and (c) an aerosol sprayed BZCY electrolyte layer. For the case of barrier layers, the first layer was replaced with bridging and porous electrode layers containing CGO instead of BZCY. After the deposition of the ceramic layers, cells were fired in air at 525° C. for 1 h to remove acrylic, pore formers, and residual solvent. Cells were then sintered for 4 h in 2% H$_2$—Ar environment at 1450° C. with gas used straight from the cylinder without additional drying, unless indicated otherwise.

Sintering BZCY below 1500° C. is challenging, and the requirement of using reducing atmosphere for co-sintering with metal support complicates selection of a viable approach. Of particular concern is Si migration into BZCY from the metal support, and achieving densification of the BZCY electrolyte layer. Here, we explore whether increasing the Ce:Zr content is a viable approach to promote sintering in reducing atmosphere, determine the impact of sintering temperature on Si migration, assess the use of a low-Si-content metal support, and introduce a barrier layer to minimize Si transport.

MS-SOFCs with YSZ electrolyte are typically sintered in the temperature range of 1250 to 1400° C. Higher sintering temperature is expected to be required for full densification of BZCY ceramics. Over-densification of the metal is a concern when sintering at higher temperature, especially above 1450° C. as clearly seen in cross-section images of MS-SOFCs with YSZ ceramic layers sintered at various temperatures (FIGS. 9A-9D). This is not surprising, as the stainless steel melting point is around 1525° C. To be compatible with co-sintering on metal support, the ceramic layer will ideally densify completely at 1450° C. or below, with shrinkage somewhat less than the bare metal (~20%). This upper sintering temperature limit is used throughout the rest of this example.

To elucidate sintering behavior of BZCY in the absence of metal support, dilatometry and pellet densification was conducted in air and reducing atmosphere. Sintering started around 900° C. and continued gradually to 1450° C. (FIG. 3A). A plateau indicating completion of sintering was not observed, although sintering continued throughout the hold at 1450° C. This is consistent with the residual porosity and incomplete densification seen for furnace-sintered pellets (FIGS. 3B-3D and Table 4). Sintering of the compositions containing Yb and with higher Ce content was delayed relative to BCZY271, but their sintering curves were steeper above about 1250° C. resulting in significantly better densification at 1450° C. This appears to be related to the Ce and Yb composition, as particle size of all powders was similar. The sintering atmosphere did not have a large impact on the timing of sintering, nor the final density achieved. The enhanced sintering for higher Ce and Yb content seen here for both atmospheres is consistent with the results from sintering in air. The pellets sintered in reducing atmosphere shrank 17-18%, which is compatible with the metal support shrinkage.

TABLE 4

Densification of BZCY721, BZCYYb4411, and BZCYYb1711. Density of pellets after sintering in air or reducing atmosphere (2% H$_2$—Ar) at 1450° C. for 2 h. Theoretical densities are provided in the scientific literature.

| Composition | Sintering environment | Sintered density (g/cm$^3$) | Density (% of theor.) |
|---|---|---|---|
| BZCY721 | Air | 4.6 | 74 |
|  | Reducing | 4.5 | 73 |
| BZCYYb4411 | Air | 5.7 | 92 |
|  | Reducing | 5.8 | 94 |
| BZCYYb1711 | Air | 5.9 | 95 |
|  | Reducing | 6.1 | 98 |

Figure 11:
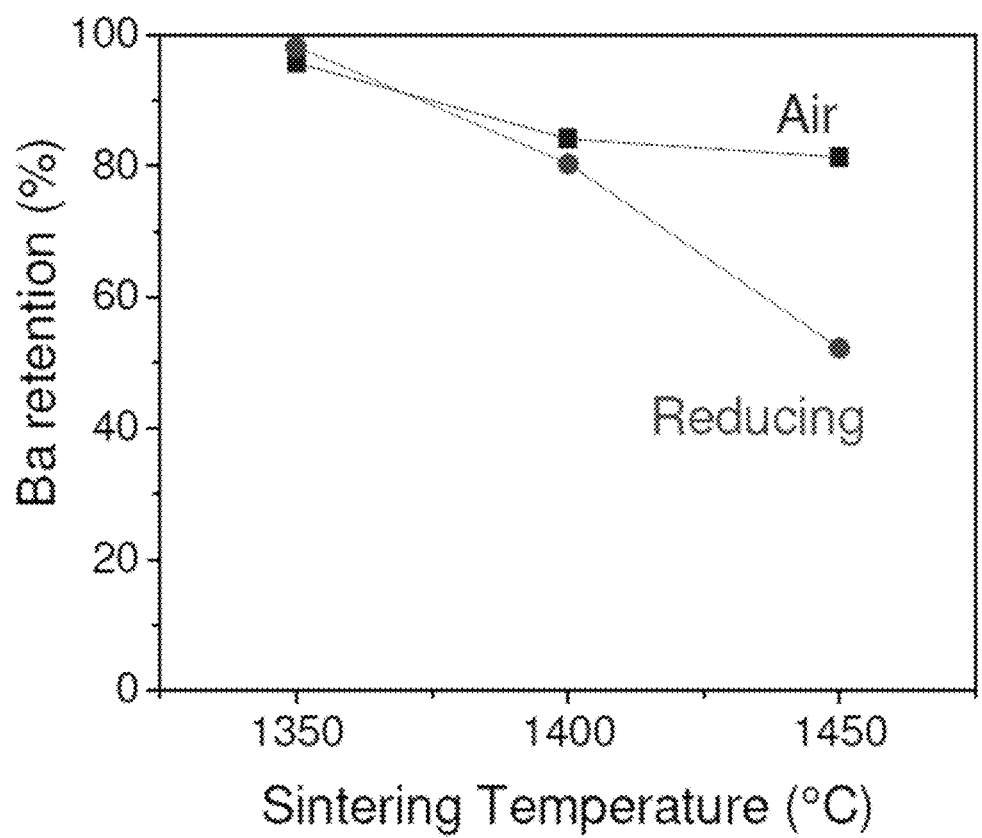
FIG. 11 shows the impact of temperature and sintering atmosphere on Ba loss. Ba content of ~10 μm BZCYYb4411 electrolyte film after sintering at various temperatures in air (squares) or reducing atmosphere (circles), normalized to as-received powder.

Ba loss via evaporation is known to occur during sintering in air, and is detrimental to proton conductivity. Here, the impact of reducing atmosphere and temperature were assessed. Thin layers of ceramic powder were painted onto YSZ substrates, and sintered at 1450° C. in reducing atmosphere. Evaporative loss of Ba was determined with EDS (FIG. 11). Ba loss increased with increasing sintering temperature, and was exacerbated by sintering in reducing atmosphere at 1400° C. and above, presenting an additional challenge for co-sintering with metal support. The reason for the atmosphere-dependence of the Ba evaporation rate is not clear at this point. The sample architecture was intended to be a worst-case scenario in which the thin electrolyte layer is the only source of Ba. Ba loss would presumably be mitigated by adding a Ba source to the electrolyte, or by the presence of other Ba-containing cell layers, an external bed of Ba-containing powder surrounding the cell, or Ba-saturated processing atmosphere.

Significant migration of Ba, Zr, Ce, Y, or Yb into the metal upon co-sintering was not observed. In contrast, our previous work demonstrated that Si and Cr migration from the stainless steel to the BZCY electrolyte does occur during co-sintering, leading to formation of Ba$_2$SiO$_4$ and BaCrO$_4$, and depletion of Ba from the proton conducting phase. This is expected to be detrimental to electrolyte performance, as the conductivity of BZCY is known to be highly sensitive to Ba content, reaction with Cr is known to be detrimental, and Ba$_2$SiO$_4$ and BaCrO$_4$ are inactive and would block the proton transport pathway. Here, the extent of migration is determined for a range of BZCY and stainless steel compositions and over a range of co-sintering temperatures (FIGS. 12A-12C).

Figure 12A:
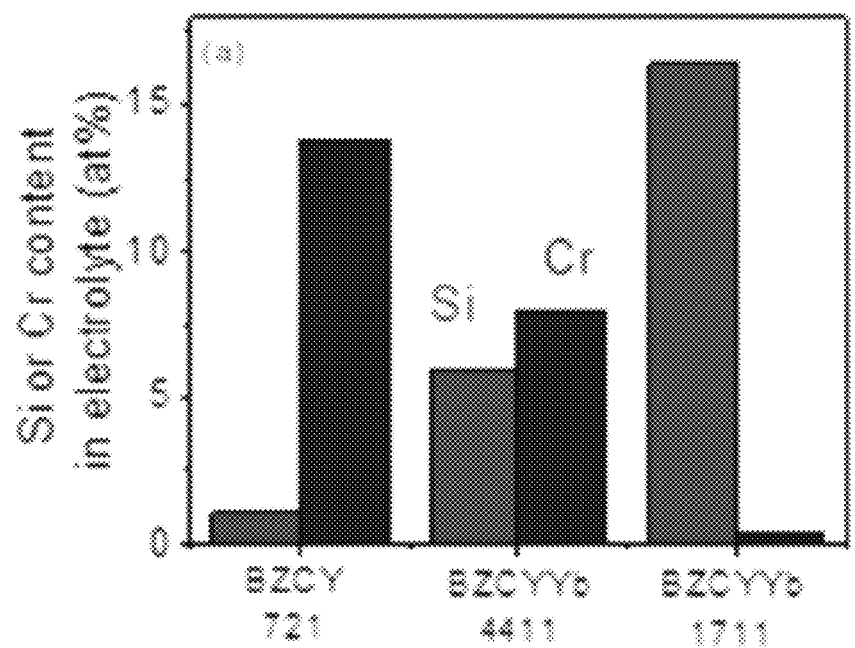
FIGS. 12A-12C show Si and Cr migration from the stainless steel support to the electrolyte layer during co-sintering. Impact of FIG. 12A—electrolyte composition, FIG. 12B—sintering temperature, and FIG. 12C—Si content in the metal support, as determined by EDS analysis. The support was 434 stainless steel, the electrolyte was BZCYYb4411, and sintering temperature was 1450° C., except as noted.
Figure 12B:
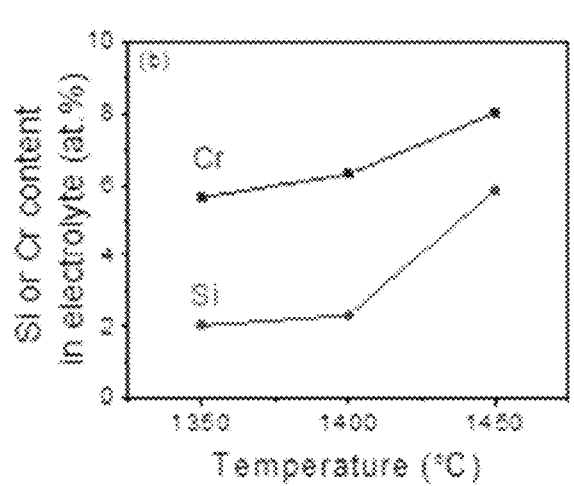
Figure 12C:
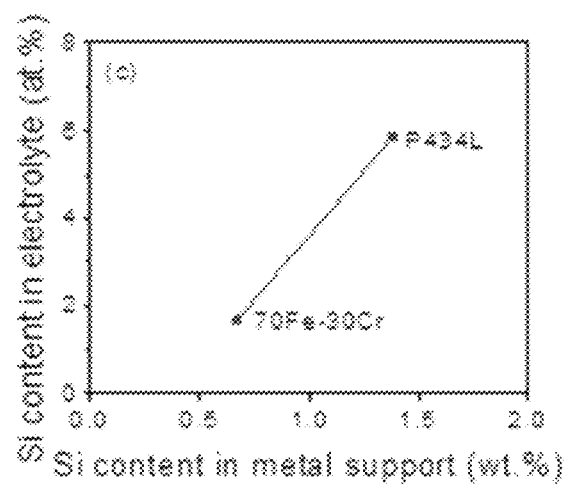

Si migration increased and Cr migration decreased dramatically with increasing Ce and Yb content (FIG. 12A). Si, and to a lesser extent Cr, migration can be curtailed by lowering the sintering temperature below 1450° C. (FIG. 12B), due to reduced Si vapor pressure and Cr diffusivity, and also reduced reactivity between Si/Cr and BZCY at lower temperature. It is expected that Si evaporates from the metal and migrates via vapor diffusion, presumably creating a Si-saturated atmosphere throughout the vicinity of the cell. In contrast, Cr is expected to migrate via solid-state diffusion, consistent with the linear gradient in Cr concentration from the metal support to the exposed side of the electrolyte. Reducing the sintering temperature appears to be a promising approach, if densification can be achieved at lower temperature. The use of sintering aids to achieve this goal is discussed below.

Commercial ferritic stainless steels generally contain some Si, which is added as a deoxidizing agent during steel melting and to improve oxidation resistance of the steel product. Si content does vary between batches and grades of stainless steel, and presumably could be minimized intentionally when optimizing a stainless steel composition for use in a metal-supported BZCY cell. To assess if minimizing the Si content in the metal support is a useful approach, we determined Si migration from two commercial stainless steel supports with differing Si content (FIG. 12C). Indeed, the extent of Si migration is quite sensitive to the Si content in the stainless steel.

To summarize, we believe that lowering the sintering temperature and Si content of the stainless steel are both viable approaches to minimizing migration. Determining the impact of various Si and Cr contents in the electrolyte layer on conductivity, thermal expansion, mechanical properties and other metrics upper is recommended as future work. This would establish acceptable limits of Si and Cr content in the electrolyte layer to guide further efforts to suppress migration.

Figures 13A, 13B:
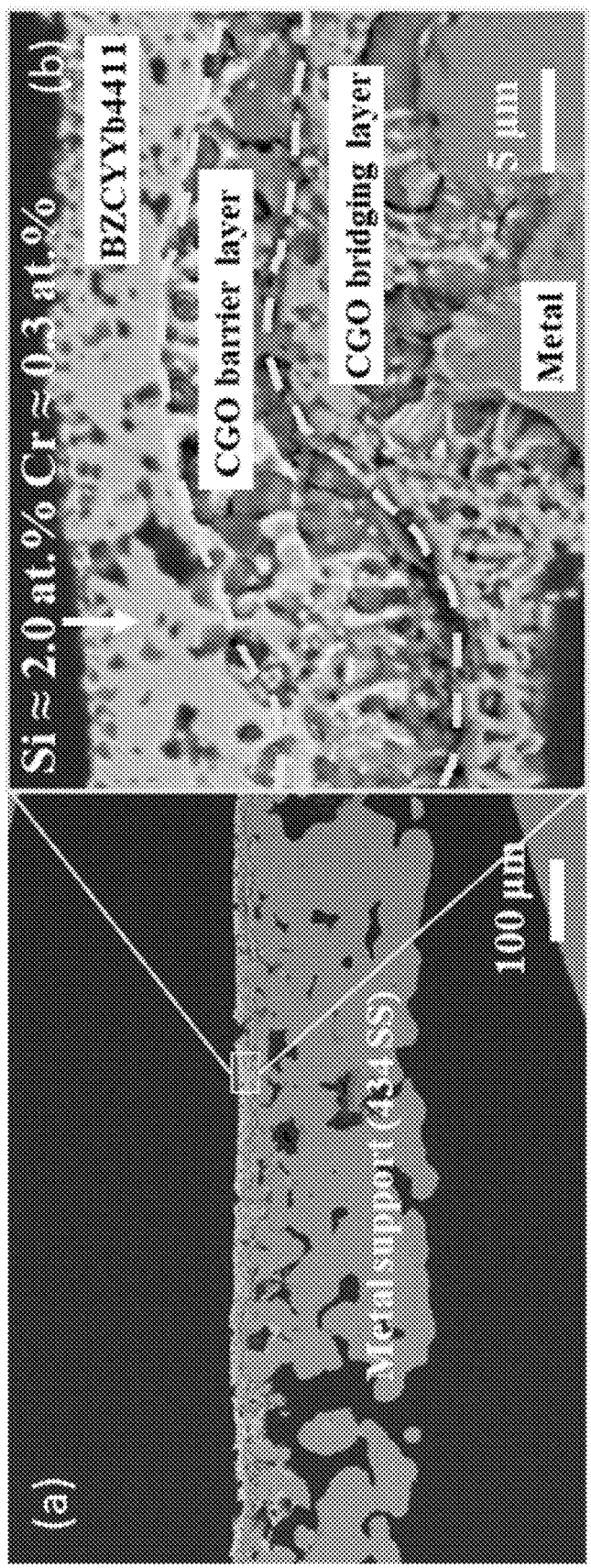
FIGS. 13A and 13B show the impact of barrier layer on Si migration. SEM images of polished cross section microstructure of BZCYYb441 electrolyte layer co-sintered on 434 stainless steel support, with CGO layers between the support and electrolyte.

Barrier layers have been used to block undesired migration of elements between adjacent layers in a variety of SOFC architectures. Here, we find that this is an effective approach for reducing Si and Cr migration from the stainless steel support to the ceramic layers. Our initial trial uses CGO as the barrier layer, chosen because it was previously reported that BZCY and CGO do not significantly interdiffuse or react with each other when sintering in reducing atmosphere at 1400° C. Si and Cr content were reduced to 2 and 0.3 at %, respectively, upon introduction of the barrier layer (FIG. 13). This was a substantial improvement over the 5.9 and 8 at % contamination for Si and Cr observed for the same BZCYYb composition and sintering conditions (FIG. 12A, BZCYYb4411). While the positive impact of the barrier layer on Si and Cr migration is clear, more work remains to understand the mechanism and facilitate this approach. The BZCYYb electrolyte layer must be further densified (FIG. 13B), possibly by addition of a sintering aid. Also, many cracks were observed in the ceramic layers (FIG. 13A), suggesting that drying, debinding, or co-sintering stresses, and shrinkage match between the layers must be improved to achieve uniform, defect-free ceramic layers.

Lowering the sintering temperature is desirable for several reasons including: 1) minimizing Si and Cr migration; 2) preventing over-densification of the metal support; 3) reducing Ba evaporation; and 4) reducing processing cost. As discussed above, increasing Ce and Yb content enhances sintering, but also dramatically increases contamination of the electrolyte layer with Si. The use of sintering aids is another approach to reduce sintering temperature that is widely used for BZCY processing in air.

Figures 14B, 14D, 14F, 14H, 14J:
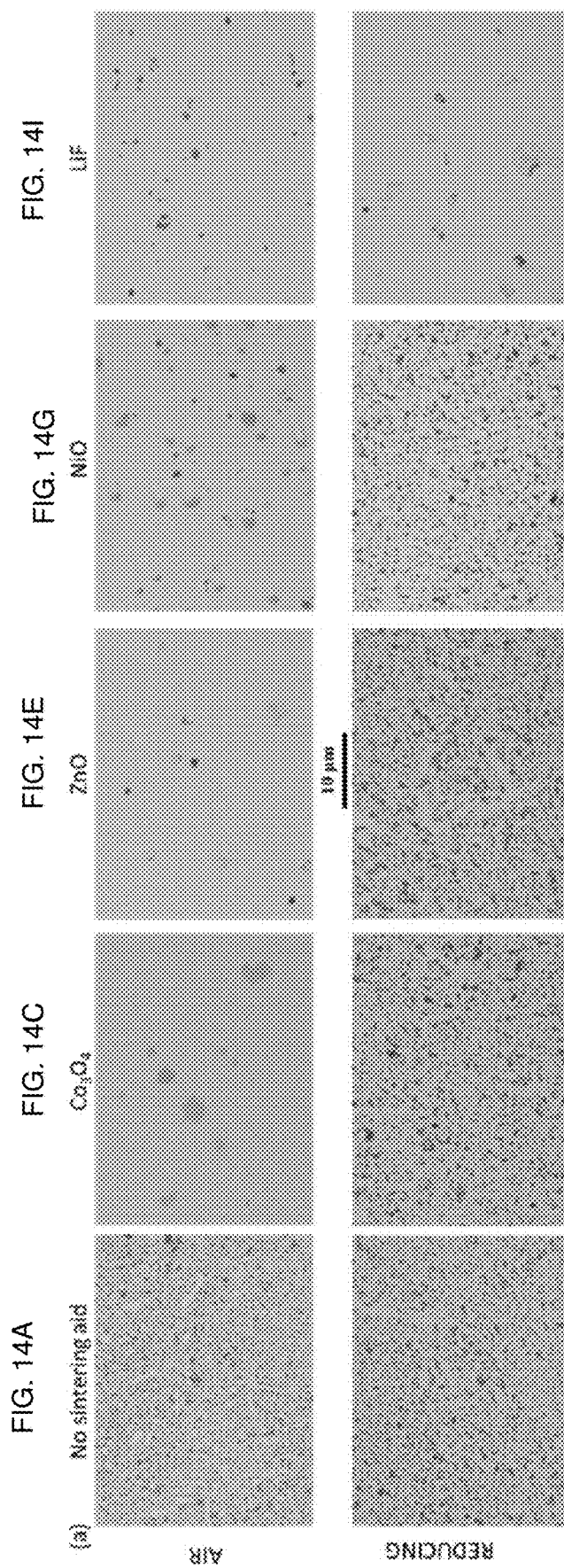
Figure 14K:
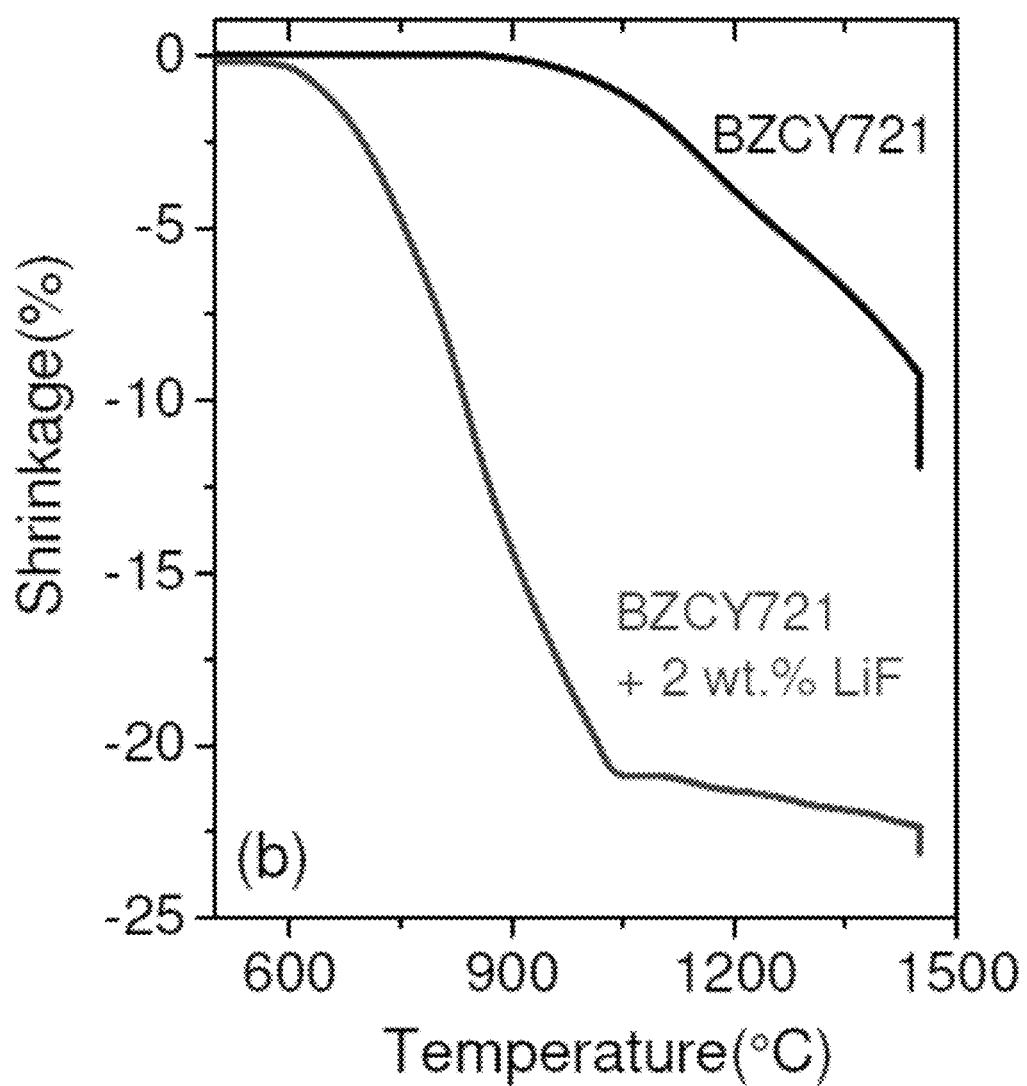
Figure 14L:
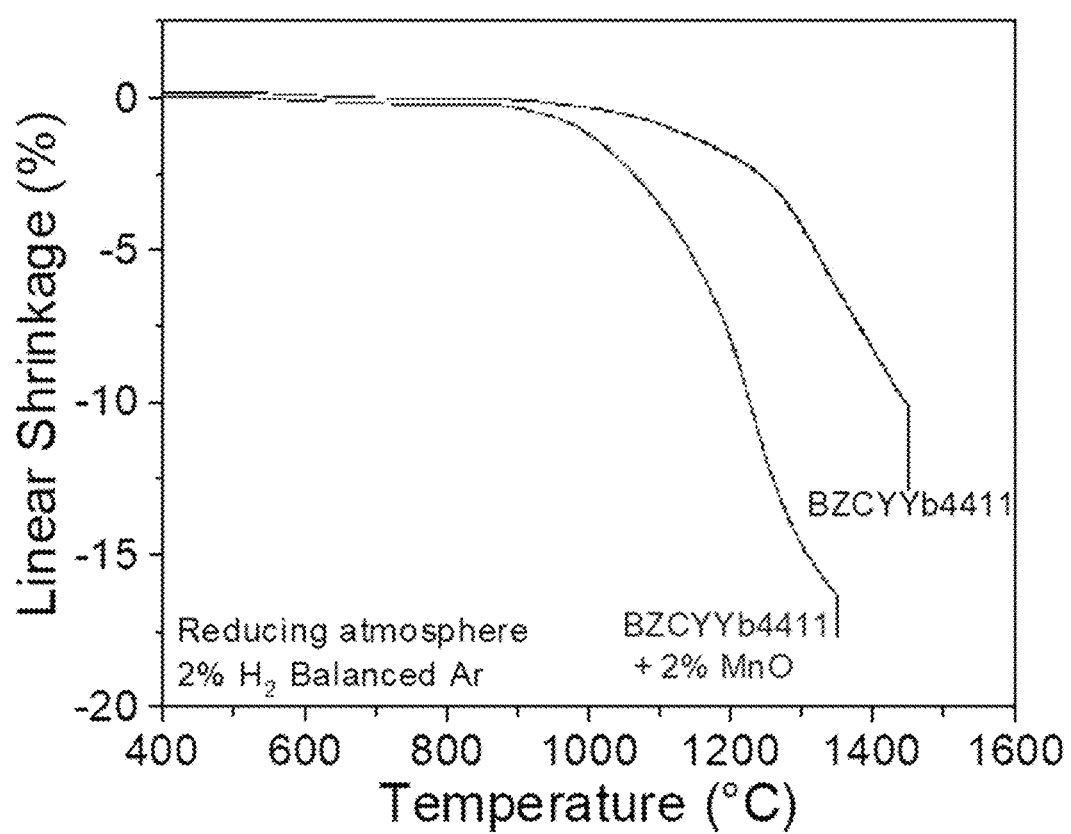

The effectiveness of various sintering aids (Co-, Zn-, and Ni-oxides and LiF, all 2 wt %) was compared for air and reducing atmospheres in FIGS. 14A-14K and Table 5. All sintering aids significantly enhanced densification in air. With the exception of manganese oxide, the oxide sintering aids were much less effective in reducing atmosphere, however, providing final density less than 90% and microstructure with pervasive porosity. This is not surprising, as these oxides are expected to be reduced to metals in reducing atmosphere, and likely segregate from the ceramic BZCY phase. The sintering temperature is also well above the boiling point of Zn, and close to the melting points of Co and Ni, so evaporative loss of the sintering aid is also a concern. In contrast, LiF was a very effective sintering aid in reducing atmosphere, providing final density of 94% and dense microstructure with minimal open porosity. Dilatometry in reducing atmosphere revealed that incipient sintering occurs 300° C. lower and sintering proceeds more rapidly with LiF addition (FIG. 14K). This is similar to the sintering enhancement in air observed in the scientific literature for a range of BZCY compositions with significantly higher LiF addition (7 wt %). They showed that LiF enhances sintering in air through a liquid phase mechanism, after which all of the Li and most of the F evaporates, and that the conductivity and mechanical properties were improved by LiF addition. Presumably, a liquid phase mechanism for sintering enhancement is also predominant in reducing atmosphere. Dilatometry in a reducing atmosphere revealed that manganese oxide is also an effective sintering aid, reducing the sintering temperature about 200° C. (FIG. 14L).

TABLE 5

Impact of sintering aids on densification of BZCY721. Density of pellets after sintering in air or reducing atmosphere (2% $H_2$—Ar) at 1450° C. for 2 h. Sintering aid loading is 2 wt %. Theoretical densities are provided in the scientific literature.

| Sintering atmosphere | Sintering aid | Sintered density (g/cm³) | Density (% of theor.) |
|---|---|---|---|
| Air | None | 4.6 | 74 |
|  | $Co_3O_4$ | 6.0 | 97 |
|  | ZnO | 6.0 | 97 |
|  | NiO | 6.1 | 99 |
|  | LiF | 5.6 | 91 |
| Reducing | None | 4.5 | 73 |
|  | $Co_3O_4$ | 5.2 | 84 |
|  | ZnO | 4.8 | 77 |
|  | NiO | 5.5 | 89 |
|  | LiF | 5.8 | 94 |

Figure 15:
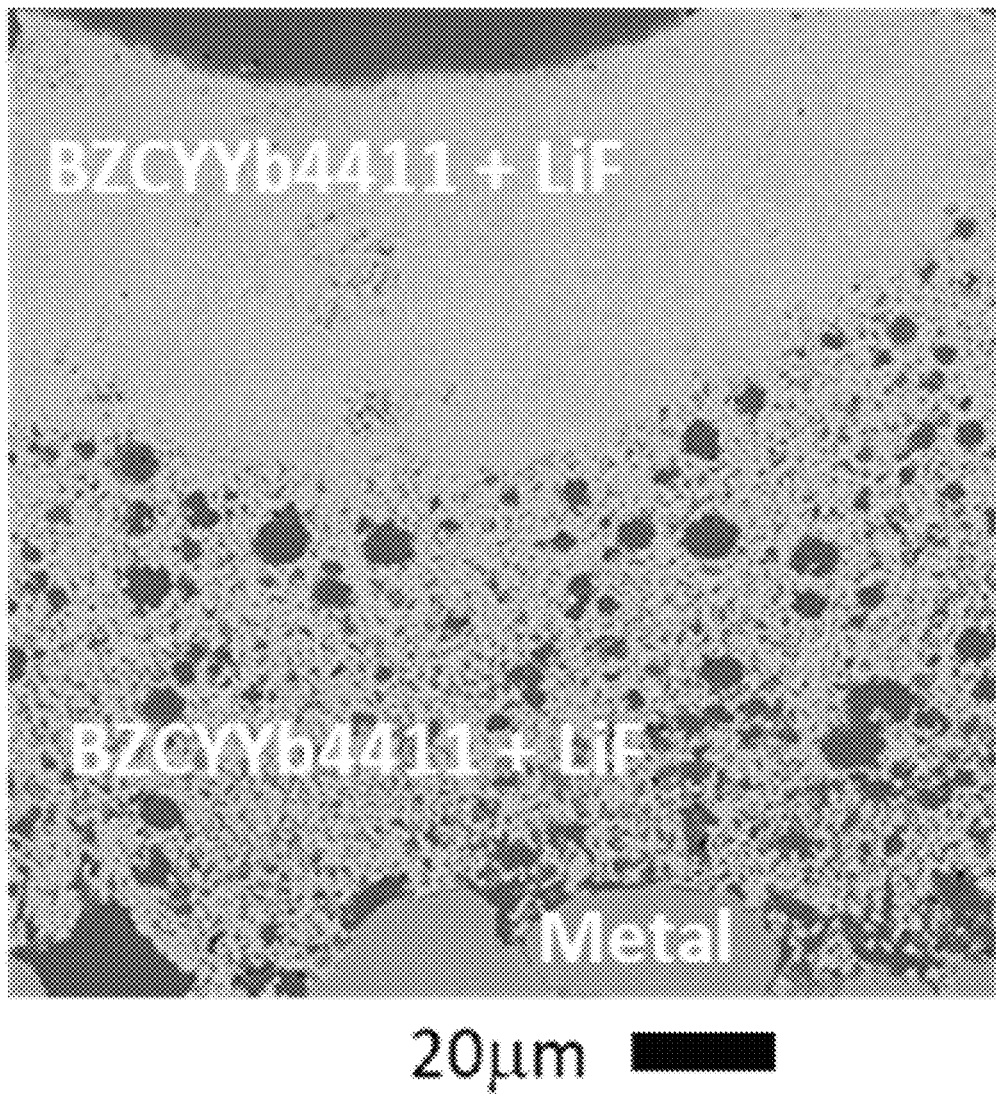
FIG. 15 shows an SEM image of polished cross section microstructure of electrolyte and porous electrode layers composed of BZCYYb4411 with LiF sintering aid (2 wt %) co-sintered on metal support at 1300° C.
Figure 16:
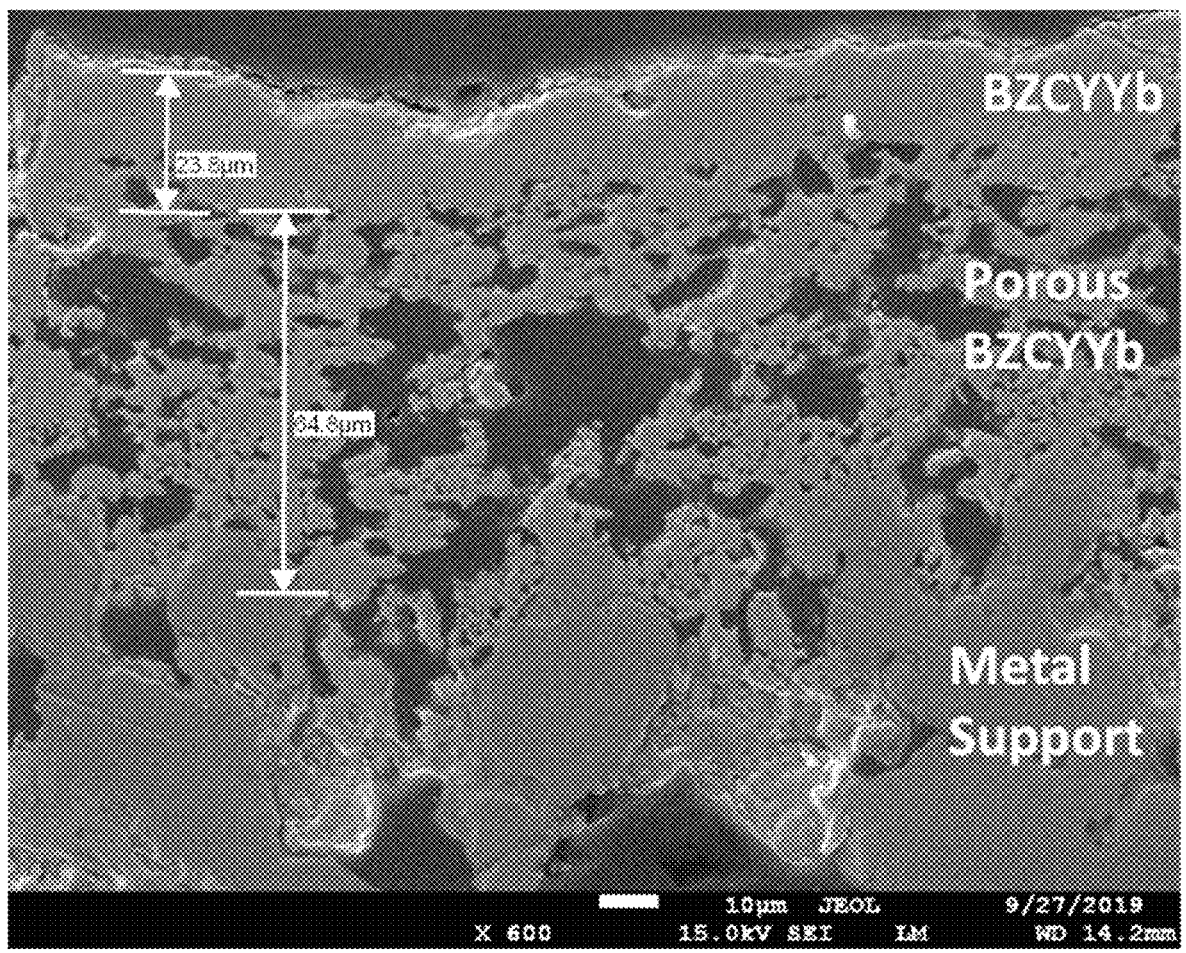
FIG. 16 shows an SEM image of polished cross section microstructure of electrolyte and porous electrode layers composed of BZCYYb4411 with manganese oxide sintering aid (2 wt %) co-sintered on metal support at 1350° C.

We prepared metal-supported electrode (porous) and electrolyte (dense) layers of BZCYYb4411 with 2 wt. % LiF by co-sintering at the reduced temperature of 1300° C. (FIG. 15). The electrolyte was visibly densified, and contained no detectable Cr and only 0.4 at % Si (compared to 5.8 at % for BZCYYb4411 at 1450° C., FIG. 12A) as a result of the lower sintering temperature. The ceramic layer sintering was so enhanced by LiF addition that the shrinkage was no longer matched well to the metal support, leading to cracking and curvature of the ceramic layers. Improving metal shrinkage at 1300° C. and below will be a subject of future effort. We prepared metal-supported electrode (porous) and electrolyte (dense) layers of BZCYYb4411 with 2 wt. % manganese oxide by co-sintering at the reduced temperature of 1350° C. (FIG. 16). The electrolyte was visibly densified. The impact of LiF or manganese oxide addition on conductivity, mechanical properties, and other metrics should be assessed in the future. Effort to discover other sintering aids that are effective in reducing atmosphere may also be fruitful.

In this example, the viability of co-sintering fabrication of metal-supported proton conducting solid oxide cells using $BaZr_{1-x-y}Ce_xY_yO_{3-d}$ (BZCY) was investigated. Critical challenges were identified for this fabrication approach, including: contamination of the electrolyte with Si and Cr from the metal support, incomplete electrolyte sintering, and evaporation of Ba. Reducing the sintering temperature mitigates Ba loss and Si/Cr migration. LiF was found to be an effective sintering aid to enable this approach. Insertion of a diffusion barrier layer and the use of low-Si-content stainless steel were found to be effective in reducing Si migration. We anticipate that the results of this example will guide further efforts to fabricate a functional metal-supported BZCY-electrolyte cell via co-sintering. In particular, the use of barrier layers, low-Si-content stainless steel, and sintering aids warrants further development.

CONCLUSION

Further description of the embodiments described herein can be found in the publications R. Wang et al., "Assessment of co-sintering as a fabrication approach for metal-supported proton-conducting solid oxide cells," 2019, Solid State Ionics 332, 25-33 and R. Wang et al., "Approaches for co-sintering metal-supported proton-conducting solid oxide cells with Ba (Zr, Ce, Y, Yb) O3-δ electrolyte," 2019, International Journal of Hydrogen Energy 44 (26), 13768-13776, both of which are herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
    (a) forming a first electrode on a metal support of a device with a first proton-conducting ceramic, the metal support comprising an iron-chromium alloy, and the first proton-conducting ceramic being in a powder form, wherein the first electrode comprises:
    a first layer of a first lattice structure, comprising ytterbium substituting approximately 10% of a first type of lattice site of the first lattice structure, and
    a second layer having substantially no ytterbium substituted lattice sites, with approximately 70% of the first type of lattice site of the second layer occupied by zirconium;
    (b) forming an electrolyte layer on the first electrode and on the metal support of the device with a second proton-conducting ceramic, and the second proton-conducting ceramic being in a powder form;
    (c) forming a second electrode on the electrolyte layer;
    (d) thermally treating the device, comprising the first electrode, the metal support, and the electrolyte layer, at about 1200° C. to 1550° C.; and
    (e) providing an electrical connection between the second electrode and the metal support, wherein the electrical connection comprises one of:
    an electrical load, or
    a power supply.

2. The method of claim 1, wherein the metal support comprises a ferritic stainless steel.

3. The method of claim 1, wherein the device is thermally treated at about 1300° C. to 1450° C.

4. The method of claim 1, wherein operation (c) is performed in a reducing atmosphere.

5. The method of claim 1, further comprising:
    prior to operation (a), forming a barrier layer on the metal support.

6. The method of claim 5, wherein the barrier layer is selected from a group consisting of yttrium-stabilized zirconia, doped ceria, lanthanum calcium niobate, and samarium cerium yttrium zirconate.

7. The method of claim 1, wherein the first proton-conducting ceramic and the second proton-conducting ceramic comprise barium cerium yttrium zirconate.

8. The method of claim 1, wherein operation (d) is performed in a reducing atmosphere, and wherein the first electrode, the electrolyte layer, or both the first electrode and the electrolyte layer include a sintering aid, selected from a group consisting of lithium hydride, lithium fluoride, lithium carbonate, lithium oxide, and manganese oxide.

9. The method of claim 1, wherein the first proton-conducting ceramic and the second proton-conducting ceramic are the same proton-conducting ceramic.

10. The method of claim 1, wherein the second proton conducting ceramic comprises material selected from a group consisting of lanthanum calcium niobate, barium cerium yttrium zirconate, and samarium cerium yttrium zirconate.

11. The method of claim 1, wherein the metal support comprises a low-silicon stainless steel including less than about 0.5 weight percent silicon.

12. The method of claim 1, wherein a thickness of the first electrode is about 10 microns to 100 microns.

13. The method of claim 1, further comprising:
    depositing a getter material on the first electrode or the metal support, wherein the getter material comprises lanthanum oxide, strontium oxide, or barium oxide.

14. The method of claim 1, further comprising:
    after operation (d), depositing a material on the first electrode, wherein the material is selected from a group consisting of a catalyst, a proton conductor, and an electronic conductor.

15. The method of claim 1, wherein the device is selected from a group consisting of a metal supported solid oxide fuel cell (MS-SOFC), a metal supported solid oxide electrolysis cell, a metal supported solid oxide electrochemical reactor, a metal supported solid oxide oxygen generator, a metal supported solid oxide electrochemical hydrogen generator, and a metal supported solid oxide electrochemical hydrogen compressor.

16. A method comprising:
    (a) forming a first electrode on a metal support of a device with barium cerium yttrium zirconate, the metal support comprising a low-silicon steel including less than about 0.5 weight percent silicon, and the barium cerium yttrium zirconate being in a powder form, wherein the first electrode comprises:
    a first layer of a first lattice structure, comprising ytterbium substituting approximately 10% of a first type of lattice site of the first lattice structure, and
    a second layer having substantially no ytterbium substituted lattice sites, having 70% of the first type of lattice site occupied by zirconium;
    (b) forming an electrolyte layer on the first electrode and on the metal support of the device with the barium cerium yttrium zirconate;
    (c) sintering the device, comprising the first electrode, the metal support, and the electrolyte layer, at about 1200° C. to 1550° C. in a reducing atmosphere;
    (d) forming a second electrode on the electrolyte layer; and
    (e) providing an electrical connection between the second electrode and the metal support.

17. The method of claim 1, wherein forming the second electrode on the electrolyte layer is performed prior to thermally treating the device, and wherein thermally treating the device comprises treating the first electrode, the metal support, the electrolyte layer, and the second electrode.

18. The method of claim 1, wherein forming the second electrode on the electrolyte layer is performed subsequent to thermally treating the device.

19. The method of claim 18, wherein the method further comprises performing an additional thermal treatment operation of the device, comprising thermally treating the first electrode, the metal support, the electrolyte layer, and the second electrode.

20. The method of claim 7, wherein the first layer is composed of BZCYYb1711, and the second layer is comprised of BZCY721.

* * * * *